US012568212B2

(12) United States Patent
Chen et al.

(10) Patent No.: US 12,568,212 B2
(45) Date of Patent: Mar. 3, 2026

(54) ADAPTIVE LOOP FILTERING ON OUTPUT(S) FROM OFFLINE FIXED FILTERING

(71) Applicant: Tencent America LLC, Palo Alto, CA (US)

(72) Inventors: Lien-Fei Chen, Hsinchu (TW); Xin Zhao, Santa Clara, CA (US); Guichun Li, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 73 days.

(21) Appl. No.: 18/208,163

(22) Filed: Jun. 9, 2023

(65) Prior Publication Data

US 2024/0031567 A1      Jan. 25, 2024

Related U.S. Application Data

(60) Provisional application No. 63/389,653, filed on Jul. 15, 2022.

(51) Int. Cl.
| | |
|---|---|
| *H04N 19/117* | (2014.01) |
| *H04N 19/167* | (2014.01) |
| *H04N 19/172* | (2014.01) |
| *H04N 19/82* | (2014.01) |

(52) U.S. Cl.
CPC ......... *H04N 19/117* (2014.11); *H04N 19/167* (2014.11); *H04N 19/172* (2014.11); *H04N 19/82* (2014.11)

(58) Field of Classification Search
CPC .. H04N 19/117; H04N 19/167; H04N 19/172; H04N 19/82; H04N 19/132

USPC ......................................................... 375/240
See application file for complete search history.

(56) References Cited

U.S. PATENT DOCUMENTS

| | | | | |
|---|---|---|---|---|
| 2012/0189064 A1* | 7/2012 | Kossentini | ........... | H04N 19/117 |
| | | | | 375/E7.193 |
| 2017/0163982 A1* | 6/2017 | Fu | ........................ | H04N 19/463 |
| 2017/0238020 A1* | 8/2017 | Karczewicz | ........... | H04N 19/80 |
| | | | | 375/240.29 |
| 2019/0306534 A1 | 10/2019 | Zhang et al. | | |

(Continued)

OTHER PUBLICATIONS

International Search Report and Written Opinion issued Sep. 20, 2023 in Application No. PCT/US2023/068435, pp. 1-23.

(Continued)

*Primary Examiner* — Susan E. Hodges
(74) *Attorney, Agent, or Firm* — ArentFox Schiff LLP

(57) ABSTRACT

An apparatus includes processing circuitry that receive a bitstream including a picture. The processing circuitry applies one or more first fixed filters with constant filter coefficients to samples in the picture to obtain one or more respective first filtered outputs of the samples in the picture. Subsequent to applying the one or more first fixed filters, the processing circuitry applies one or more second adaptive filters with changeable coefficients to the one or more first filtered outputs to obtain a second filtered sample of a current sample in the samples and decodes the picture based at least on the second filtered sample of the current sample in the picture. Each coefficient of the second adaptive filter can be applied to a corresponding one of the one or more first filtered outputs.

16 Claims, 11 Drawing Sheets

(56)            References Cited

U.S. PATENT DOCUMENTS

| | | | | |
|---|---|---|---|---|
| 2020/0344494 | A1* | 10/2020 | Hu ........................ | H04N 19/463 |
| 2021/0250597 | A1* | 8/2021 | Du ........................ | H04N 19/186 |
| 2022/0053186 | A1* | 2/2022 | Paluri ................. | H04N 19/159 |
| 2022/0408085 | A1* | 12/2022 | Lim ..................... | H04N 19/117 |
| 2023/0300328 | A1* | 9/2023 | Hu ........................ | H04N 19/176 |
| | | | | 375/240.02 |

OTHER PUBLICATIONS

ITU-T Study Group. "High efficiency video coding, Series H: Audiovisual and multimedia systems: Infrastructure of audiovisual services—coding of moving video." in General Secretariat and Telecom Radiocommunication (ITU-R) Standardization (ITU-T), sec. H 265, Dec. 2016, pp. 1-664.
ITU-T Study Group. "Versatile video coding, Series H: Audiovisual and multimedia systems: Infrastructure of audiovisual services—coding of moving video." in General Secretariat and Telecom Radiocommunication (ITU-R) Standardization (ITU-T), sec. H 266, Aug. 2020, pp. 1-516.
M. Coban, et. al., "Algorithm description of Enhanced Compression Model 5 (ECM5)", ISO/IEC JTC1/SC29/WG5 JVET-Z2025, Apr. 2022, pp. 1-45.
W. Yin, K. Zhang, Z. Deng, and L. Zhang, "EE2-Related: Extended Offline-Filtering Taps for ALF", ISO/IEC JTC1/SC29/WG5 JVET-AA0147, Jul. 2022, pp. 1-4.

* cited by examiner

| $E_{HV}^i$ \ $E_D^i$ | 0 | 1 | 2 | 3 | 4 | 5 | 6 |
|---|---|---|---|---|---|---|---|
| 0 | 0 | 0 | 0 | 0 | 0 | 0 | 0 |
| 1 | 1 | 2 | 0 | 0 | 0 | 0 | 0 |
| 2 | 3 | 4 | 5 | 0 | 0 | 0 | 0 |
| 3 | 6 | 7 | 8 | 9 | 0 | 0 | 0 |
| 4 | 10 | 11 | 12 | 13 | 14 | 0 | 0 |
| 5 | 15 | 16 | 17 | 18 | 19 | 20 | 0 |
| 6 | 21 | 22 | 23 | 24 | 25 | 26 | 27 |

| $E_D^i$ \ $E_{HV}^i$ | 0 | 1 | 2 | 3 | 4 | 5 | 6 |
|---|---|---|---|---|---|---|---|
| 0 | 28 | 0 | 0 | 0 | 0 | 0 | 0 |
| 1 | 29 | 30 | 0 | 0 | 0 | 0 | 0 |
| 2 | 31 | 32 | 33 | 0 | 0 | 0 | 0 |
| 3 | 34 | 35 | 36 | 37 | 0 | 0 | 0 |
| 4 | 38 | 39 | 40 | 41 | 42 | 0 | 0 |
| 5 | 43 | 44 | 45 | 46 | 47 | 48 | 0 |
| 6 | 49 | 50 | 51 | 52 | 53 | 54 | 55 |

Spatial Taps                Fixed-Filter Results based Taps

$$g_{0,11} = g_0(x0 - 1, y0 - 1) + g_0(x0 + 1, y0 + 1)$$

$$g_{1,0} = g_1(x0, y0)$$

$$g_{0,16} = g_0(x0 - 4, y0) + g_0(x0 + 4, y0)$$

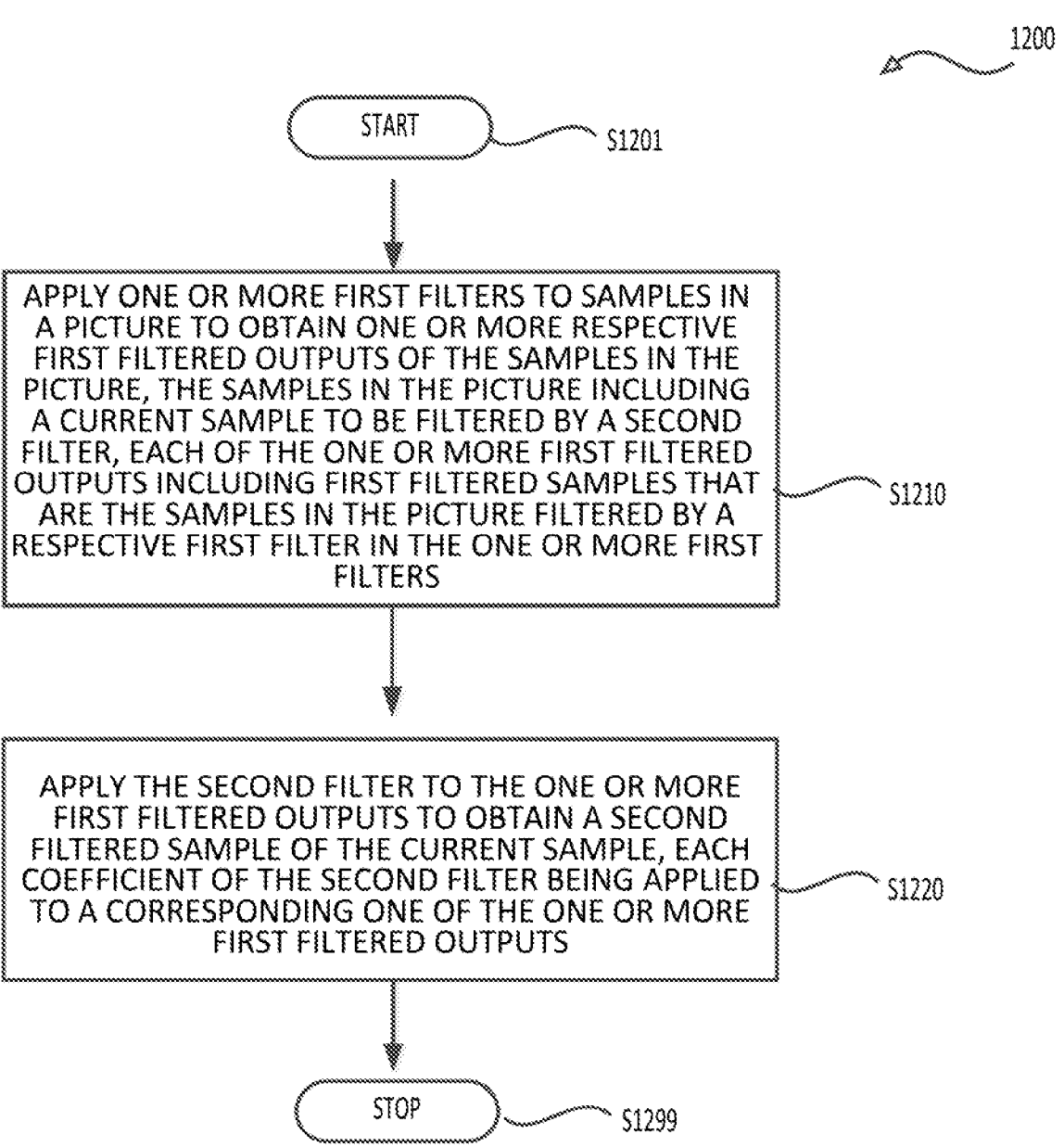

1200

START    S1201

APPLY ONE OR MORE FIRST FILTERS TO SAMPLES IN A PICTURE TO OBTAIN ONE OR MORE RESPECTIVE FIRST FILTERED OUTPUTS OF THE SAMPLES IN THE PICTURE, THE SAMPLES IN THE PICTURE INCLUDING A CURRENT SAMPLE TO BE FILTERED BY A SECOND FILTER, EACH OF THE ONE OR MORE FIRST FILTERED OUTPUTS INCLUDING FIRST FILTERED SAMPLES THAT ARE THE SAMPLES IN THE PICTURE FILTERED BY A RESPECTIVE FIRST FILTER IN THE ONE OR MORE FIRST FILTERS    S1210

APPLY THE SECOND FILTER TO THE ONE OR MORE FIRST FILTERED OUTPUTS TO OBTAIN A SECOND FILTERED SAMPLE OF THE CURRENT SAMPLE, EACH COEFFICIENT OF THE SECOND FILTER BEING APPLIED TO A CORRESPONDING ONE OF THE ONE OR MORE FIRST FILTERED OUTPUTS    S1220

STOP    S1299

*FIG. 12*

ADAPTIVE LOOP FILTERING ON OUTPUT(S) FROM OFFLINE FIXED FILTERING

INCORPORATION BY REFERENCE

The present application claims the benefit of priority to U.S. Provisional Application No. 63/389,653, "Adaptive Loop Filter on Offline Fixed Filtering" filed on Jul. 15, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and an apparatus for video and/or picture encoding/decoding. The method includes receiving a bitstream including a picture. One or more first filters can be applied to samples in the picture to obtain one or more respective first filtered outputs of the samples in the picture. The samples in the picture can include a current sample to be filtered by a second filter. Each of the one or more first filtered outputs can include first filtered samples that are the samples in the picture filtered by a respective first filter in the one or more first filters. The second filter can be applied to the one or more first filtered outputs to obtain a second filtered sample of the current sample. Each coefficient of the second filter can be applied to a corresponding one of the one or more first filtered outputs.

The apparatus includes processing circuitry that receive a bitstream including a picture. The processing circuitry applies one or more first filters to samples in the picture to obtain one or more respective first filtered outputs of the samples in the picture. The samples in the picture can include a current sample to be filtered by a second filter. Each of the one or more first filtered outputs includes first filtered samples that are the samples in the picture filtered by a respective first filter in the one or more first filters. The processing circuitry applies the second filter to the one or more first filtered outputs to obtain a second filtered sample of the current sample. Each coefficient of the second filter is applied to a corresponding one of the one or more first filtered outputs.

In an embodiment, the method includes receiving a bitstream including a picture. The method includes applying one or more first fixed filters with constant filter coefficients to samples in the picture to obtain one or more respective first filtered outputs of the samples in the picture. Subsequent to applying the one or more first fixed filters, the method includes applying one or more second adaptive filters with changeable coefficients to the one or more first filtered outputs to obtain a second filtered sample of a current sample in the samples and decoding the picture based at least on the second filtered sample of the current sample in the picture.

Aspects of the disclosure also provide a non-transitory computer-readable medium storing instructions which when executed by a computer for video encoding/decoding cause the computer to perform the methods for video encoding/decoding.

BRIEF DESCRIPTION OF THE DRAWINGS

Further features, the nature, and various advantages of the disclosed subject matter will be more apparent from the following detailed description and the accompanying drawings in which:

FIG. 12 shows a flow chart outlining an encoding process according to an embodiment of the disclosure.

DETAILED DESCRIPTION OF EMBODIMENTS

Figure 1:
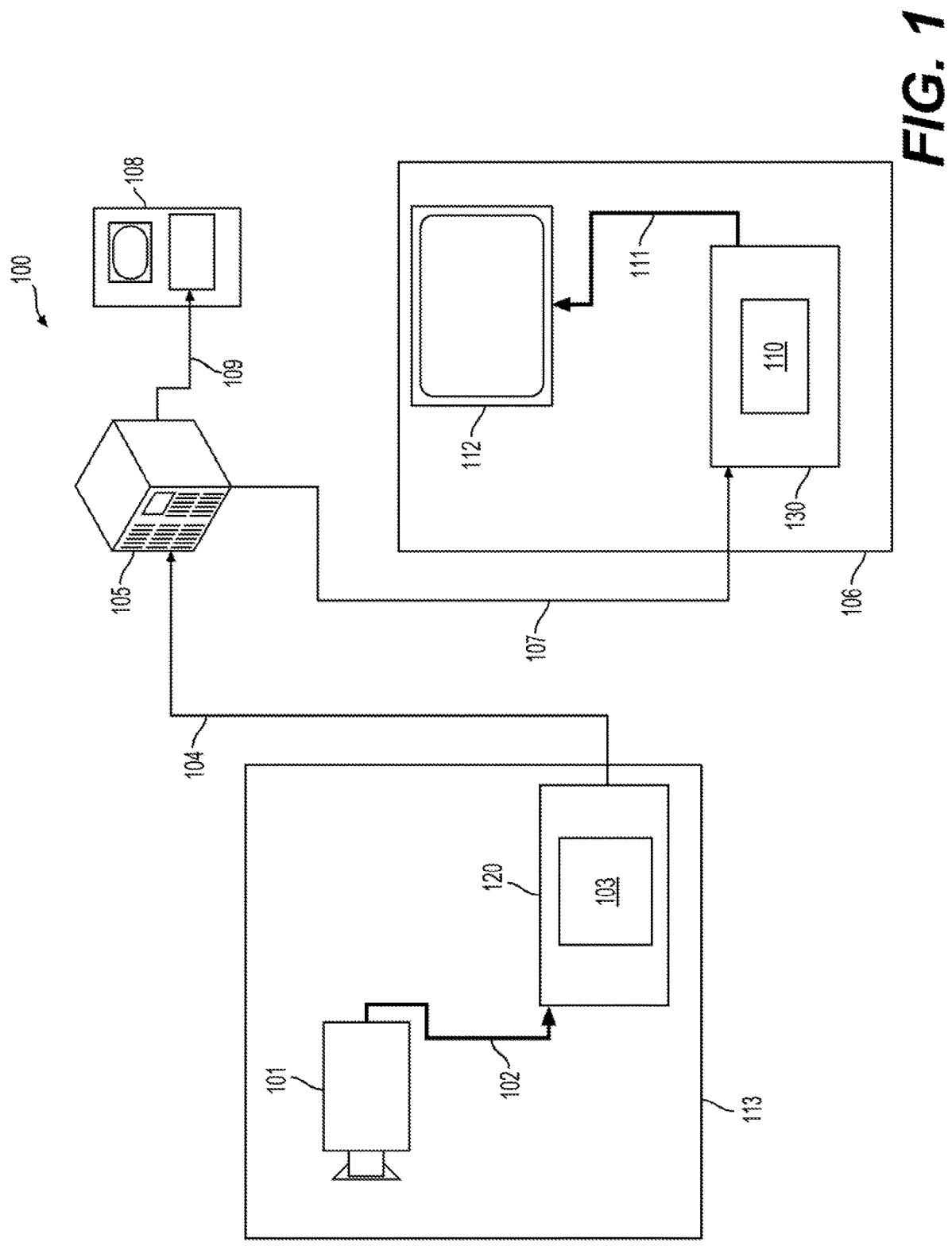
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
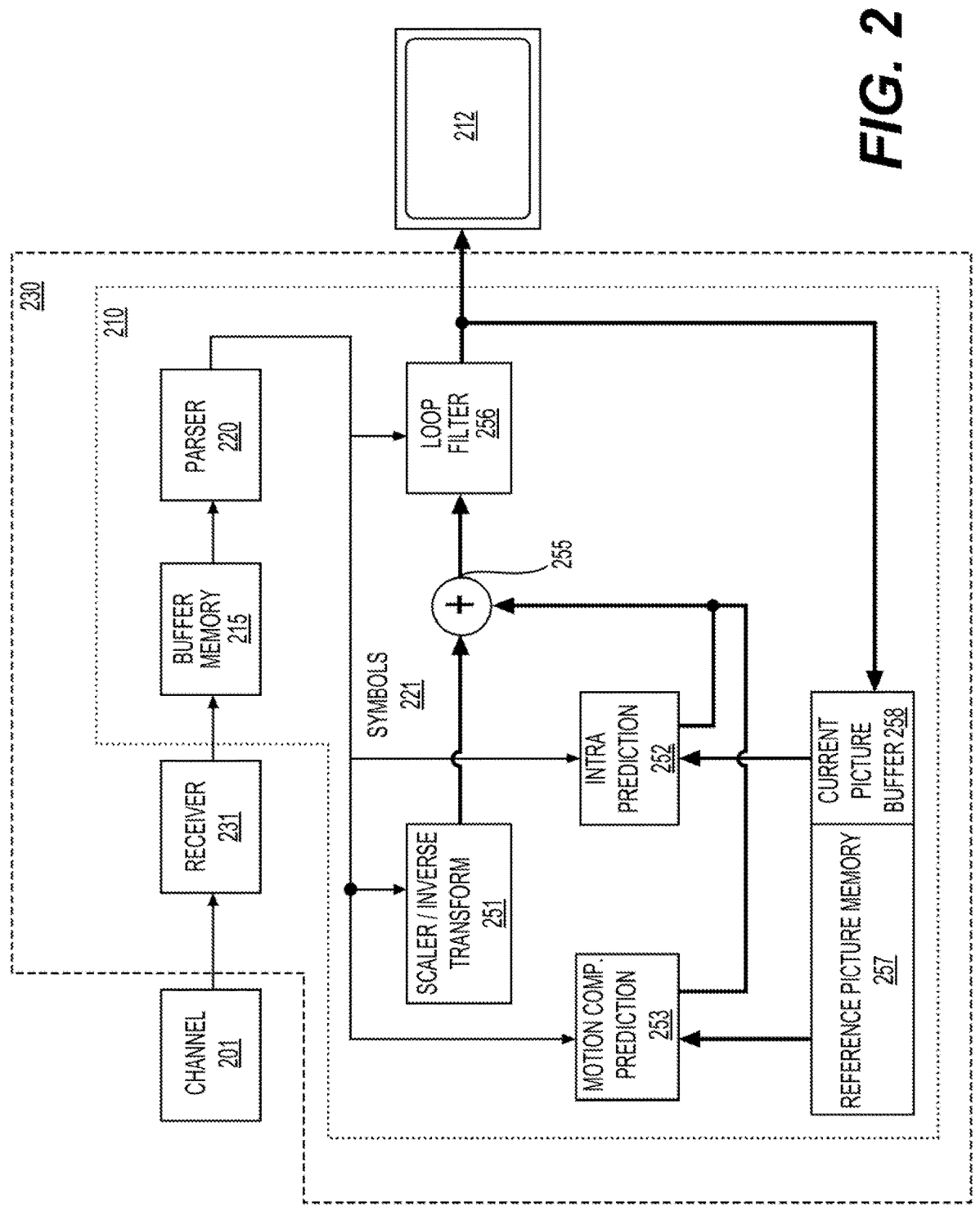
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
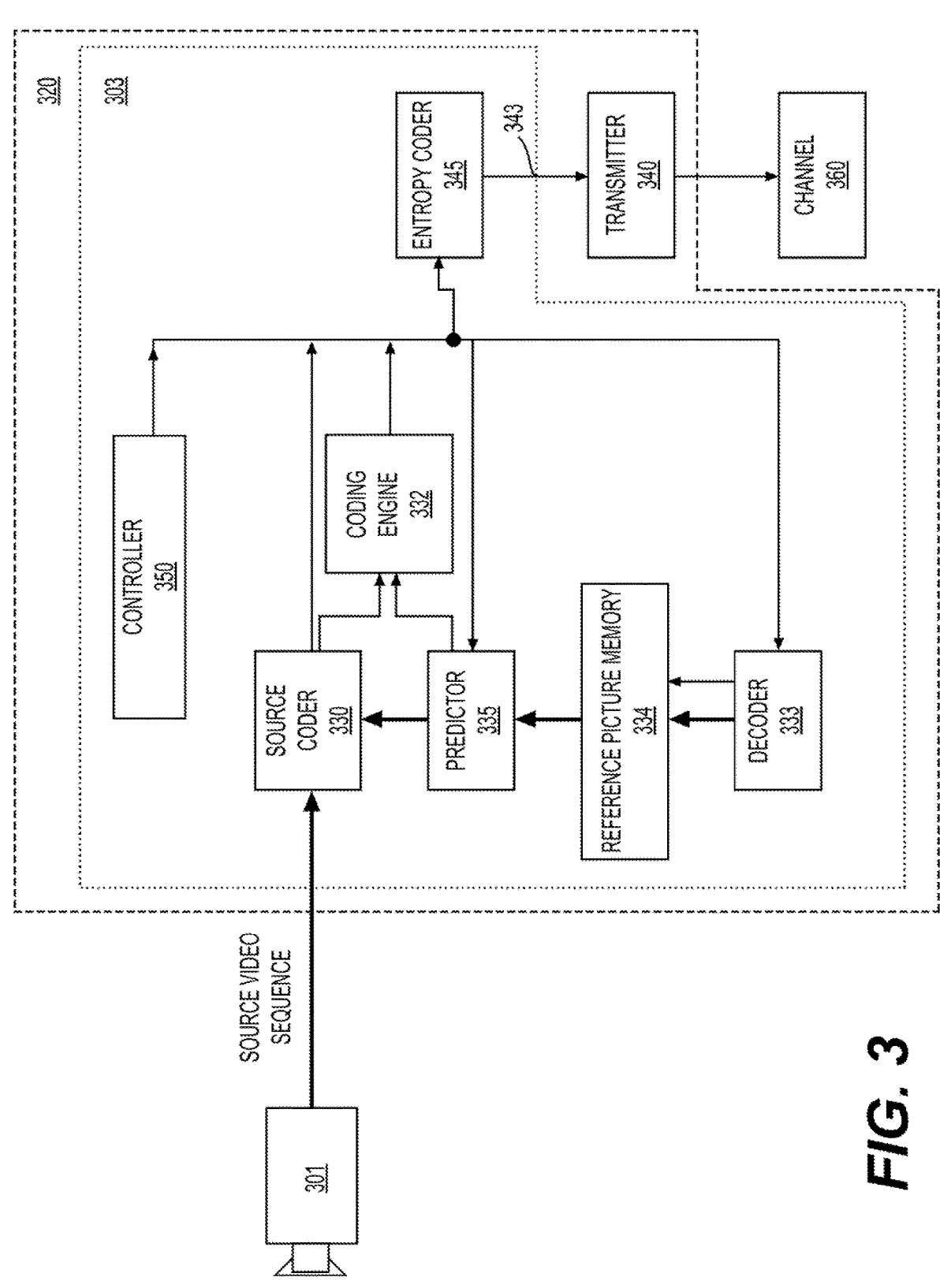
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Block-based video/image coding architecture, such as classic block-based hybrid video coding architecture, can be applied, for example, in VVC. Certain coding tools can be included in a basic building block to improve compression, for example, in VVC.

In an embodiment, such as in VVC, a quadtree plus multi-type tree (QT+MTT) scheme using quaternary splits followed by binary and ternary splits for a partitioning structure is used, for example, to replace a quadtree with multiple partition types that are used, for example, in HEVC. A separate partitioning tree structure can be supported for luma and chroma channels respectively. For an inter frame, the luma channel and the chroma channel in one CTU can share a same coding tree structure. For an intra frame, the luma channel and the chroma channel can have separate trees to improve the coding efficiency of the chroma channel.

Various inter prediction modes can be used in VVC. For an inter-predicted CU, motion parameters can include motion vector(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where motion information including, for example, MV(s), a corresponding reference picture index for each reference picture list, a reference picture list usage flag, and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like.

In some embodiments, for an intra-predicted CU, samples of the intra-predicted CU are predicted from reference samples in neighboring blocks, for example, to the left and above of the current CU (e.g., the intra-predicted CU), which has previously been decoded prior to in-loop filtering in the same picture. In an example, such as in HEVC, 35 intra-picture prediction modes can be used, including a planar mode, a DC mode (e.g., a reference sample average mode), and 33 directional angular modes. Various tools can be used in intra prediction, for example, in VVC, including but not limited to (i) 93 intra-picture directional prediction angles including a wide-angle intra prediction (WAIP) mode; (ii) two sets of 4-tap interpolation filters; position-dependent prediction combination (PDPC); multiple reference line (MRL); a cross-component linear model (CCLM); and an intra sub-partition (ISP).

In order to achieve better energy compaction of residual data and to further reduce quantization errors of transformed coefficients, the following tools can be used, for example, in WC. The tools can include but not limited to non-square transforms, a multiple transform selection (MTS) including an explicit MTS and an implicit MTS, a low-frequency non-separable transform (LFNST), a subblock transform (SBT), a dependent quantization (DQ), a joint coding of chroma residual (JCCR), and the like.

In some examples, such as in WC, a remapping operation and three in-loop filters can be applied sequentially to a reconstructed frame or picture to eliminate different types of artifacts. For example, a sample-based process such as a Luma Mapping with Chroma Scaling (LMCS) process is performed. Then, a deblocking filter can be used to reduce blocking artifacts. A sample-adaptive offset (SAO) filter can be applied to the deblocked picture to attenuate ringing and banding artifacts. An alternative loop-filter (ALF) can be applied to reduce other potential distortions introduced by the transform and quantization process. In an example, such as in WC, the ALF can include two operations. The first operation can be a block-based ALF, such as the ALF with block-based filter adaption for both luma and chroma samples, and the second operation can be a cross-component alternative loop filter (CC-ALF) for chroma samples only.

Figure 4:
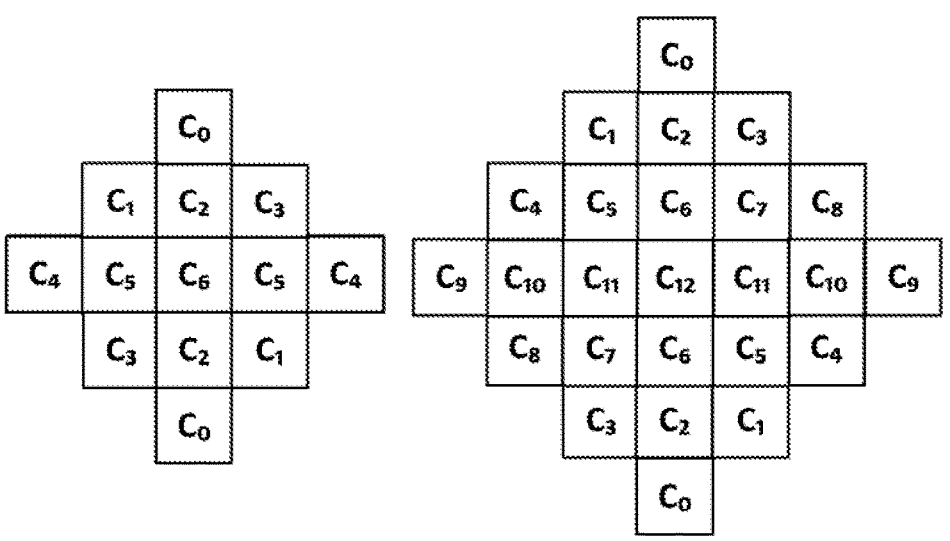
FIG. 4 shows exemplary adaptive loop filter (ALF) filter shapes according to an embodiment of the disclosure.

In some examples, such as in VVC, two filter shapes (e.g., two diamond filter shapes) can be used for the block-based ALF. FIG. 4 shows exemplary ALF filter shapes including a 5×5 diamond shape (left) and a 7×7 diamond shape (right) according to an embodiment of the disclosure. In an example, the 7×7 diamond shape is applied to a luma component, and the 5×5 diamond shape is applied to a chroma component.

One among up to 25 filters can be selected for a block (e.g., a 4×4 block or each 4×4 block) based on a direction (or directionality) and an activity of local gradients. According to the directionality and the activity of the local gradient, a block (e.g., a 4×4 block) can be classified and categorized into one of 25 classes. Each class can have a respective filter coefficient assignment. Before filtering, a geometric transformation, such as 90° rotation, a diagonal flip, or a vertical flip, can be applied to a filter shape depending on gradient values calculated for the block. The geometric transformation can be equivalent to applying the geometric transformation to samples in a filter support region. The motivation for performing the geometric transformation can include performing the ALF for each block more similarly by aligning the directionality of the respective block.

In addition to a luma block-level (e.g., a 4×4 block-level) filter adaptation, a CTU-level filter adaptation can be used in the ALF. Each CTU can use a filter set calculated from a current slice, one of the filter sets signaled at already coded slices, or one of pre-defined filter sets (e.g., 16 offline trained filter sets). Within each CTU, the selected filter set can be applied to each 4×4 block. Filter coefficients and clipping indices can be carried (or signaled) in ALF adaptive parameter sets (APSs) (e.g., multiple AFL APSs). An ALF APS can include up to 8 chroma filters and one luma filter set with up to 25 filters. An index $i_c$ indicating a luma filer class can be included for each of the 25 luma classes. In an example, to reduce signaling overhead, filter coefficients of different classifications for luma components can be merged. By merging different classes, a number of bits indicating filter coefficients can be reduced.

Figure 5:
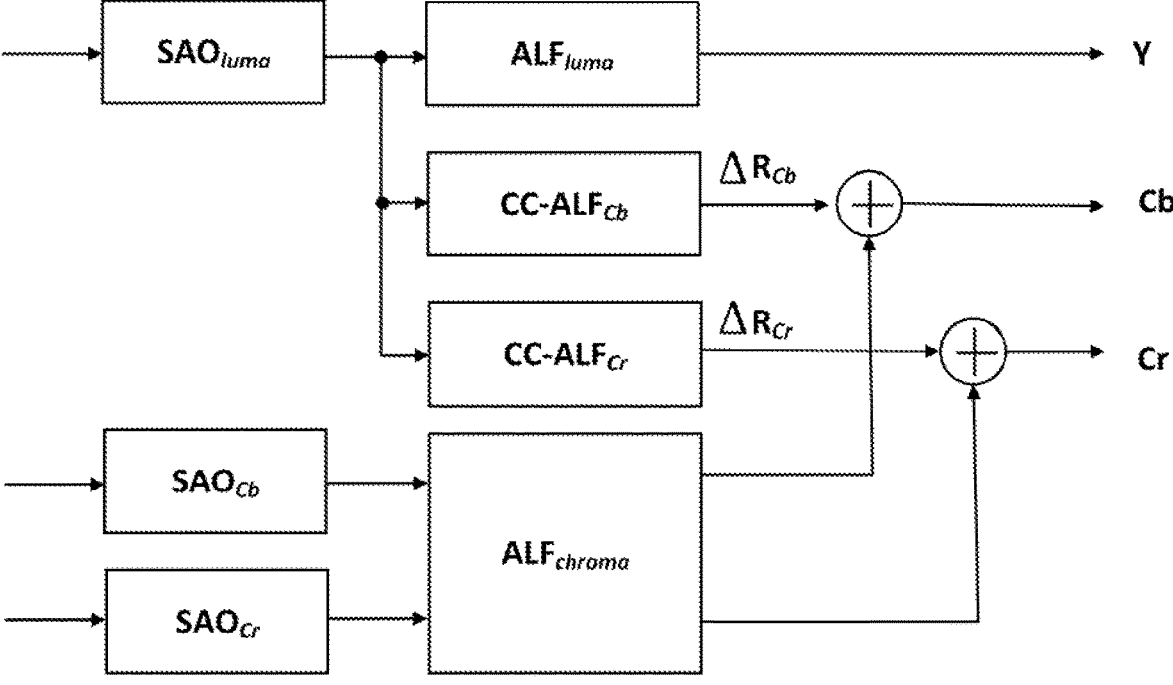
FIG. 5 shows an example of a cross-component alternative loop filter (CC-ALF).

FIG. 5 shows an example of the CC-ALF. The CC-ALF can use luma sample values (e.g., $SAO_{luma}$) to refine chroma sample values within the ALF process. A linear filtering operation (e.g., $CC\text{-}ALF_{Cb}$ or $CC\text{-}ALF_{Cr}$) can take a luma sample (e.g., $SAO_{luma}$) as an input and generate correction values (e.g., $\Delta RC_b$, $\Delta RC_r$) for chroma sample values. The correction values can be generated independently for each chroma component (e.g., Cb or Cr), such as shown in FIG. 5. In an example, the correction value (e.g., $\Delta RC_b$ or $\Delta RC_r$) can be added to an output from the ALF (e.g., the $ALF_{chroma}$) for a chroma component to generate a filtered chroma output, such as Cb or Cr.

For block classification of a luma component, a 4×4 block (e.g., a luma block) can be categorized or classified as one of multiple (e.g., 25) classes. A classification index C can be derived based on a directionality parameter D and a quantized value A of an activity using Eq. (1).

$$2C=5D+\hat{A} \qquad \text{Eq. (1)}$$

To calculate the directionality parameter D and the quantized value Â, gradients $g_v$, $g_h$, $g_{d1}$, and $g_{d2}$ of a vertical, a horizontal, and two diagonal directions (e.g., d1 and d2), respectively, can be calculated using 1-D Laplacian as follows.

$$g_v=\Sigma_{k=i-2}^{i+3}\Sigma_{l=j-2}^{j+3}V_{k,l}, V_{k,l}=|2R(k,l)-R(k,l-1)-R(k,l+1)| \qquad \text{Eq. (2)}$$

$$g_h=\Sigma_{k=i-2}^{i+3}\Sigma_{l=j-2}^{j+3}H_{k,l}, H_{k,l}=|2R(k,l)-R(k-1,l)-R(k+1,l)| \qquad \text{Eq. (3)}$$

$$g_{d1}=\Sigma_{k=i-2}^{i+3}\Sigma_{l=j-3}^{j+3}D1_{k,l}, D1_{k,l}=|2R(k,l)-R(k-1,l-1)-R(k+1,l+1)| \qquad \text{Eq. (4)}$$

$$g_{d2}=\Sigma_{k=i-2}^{i+3}\Sigma_{l=j-2}^{j+3}D2_{k,l}, D2_{k,l}=|2R(k,l)-R(k-1,l+1)-R(k+1,l-1)| \qquad \text{Eq. (5)}$$

where indices i and j can refer to coordinates with respect to an upper left sample within the 4×4 block and R(k,l) indicates a reconstructed sample at a coordinate (k,l). The directions (e.g., d1 and d2) can refer to 2 diagonal directions.

Figures 6A, 6B, 6C, 6D, 7A, 7B:
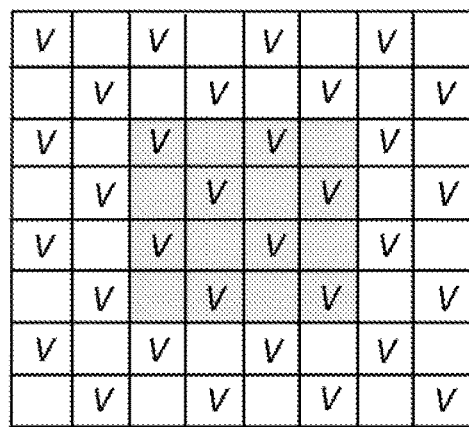
FIGS. 6A-6D show examples of subsampled positions used for calculating a vertical gradient, a horizontal gradient, and diagonal gradients.
FIGS. 7A-7B show mapping relationships between a directionality and edge strengths according to embodiments of the disclosure.

To reduce complexity of the block classification described above, a subsampled 1-D Laplacian calculation can be applied. FIGS. 6A-6D show examples of subsampled positions used for calculating the vertical gradient $g_v$ (FIG. 6A), the horizontal gradient $g_h$ (FIG. 6B), the diagonal gradient $g_{d1}$ (FIG. 6C), and the diagonal gradient $g_{d2}$ (FIG. 6D), respectively. The same subsampled positions can be used for gradient calculation of the different directions. In FIG. 6A, labels 'V' show the subsampled positions to calculate the vertical gradient $g_v$. In FIG. 6B, labels 'H' show the subsampled positions to calculate the horizontal gradient $g_h$. In FIG. 6C, labels 'D1' show the subsampled positions to calculate the $d_1$ diagonal gradient $g_{d1}$. In FIG. 6D, labels 'D2' show the subsampled positions to calculate the d2 diagonal gradient $g_{d2}$.

A maximum value $g_{h,v}^{max}$ and a minimum value $g_{h,v}^{min}$ of the gradients of horizontal and vertical directions $g_v$ and $g_h$ can be set as:

$$g_{h,v}^{max}=\max(g_h,g_v), g_{h,v}^{min}=\min(g_h,g_v) \qquad \text{Eq. (6)}$$

A maximum value $g_{d1,d2}^{max}$ and a minimum value $g_{d1,d2}^{min}$ of the gradients of two diagonal directions $g_{d1}$ and $g_{d2}$ can be set as:

$$g_{d1,d2}^{max}=\max(g_{d1},g_{d2}), g_{d1,d2}^{min}=\min(g_{d1},g_{d2}) \qquad \text{Eq. (7)}$$

The directionality parameter D can be derived based on the above values and two thresholds $t_1$ and $t_2$ as below.

Step 1. If (1) $g_{h,v}^{max} \le t_1 \cdot g_{h,v}^{min}$ and (2) $g_{d1,d2}^{max} \le t_1 \cdot g_{d1,d2}^{min}$ are true, D is set to 0.

Step 2. If $g_{h,v}^{max}/g_{h,v}^{min} > g_{d1,d2}^{max}/g_{d1,d2}^{min}$, continue to Step 3; otherwise continue to Step 4.

Step 3. If $g_{h,v}^{max} > t_2 \cdot g_{h,v}^{min}$, D is set to 2; otherwise D is set to 1.

Step 4. If $g_{d1,d2}^{max} > t_2 \cdot g_{d1,d2}^{min}$, D is set to 4; otherwise D is set to 3.

The activity value A can be calculated as:

$$A=\Sigma_{k=i-2}^{i+3}\Sigma=l=j-2^{j+3}(V_{k,l}+H_{k,l}) \qquad \text{Eq. (8)}$$

A can be further quantized to a range of 0 to 4, inclusively, and the quantized value is denoted as Â.

In an example, for chroma components in a picture, no block classification is applied, and thus a single set of ALF coefficients can be applied for each chroma component.

Geometric transformations can be applied to filter coefficients and corresponding filter clipping values (also referred to as clipping values). Before filtering a block such as a 4×4 luma block, geometric transformations such as a rotation or a diagonal and a vertical flipping can be applied to the filter coefficients f(k,l) and the corresponding filter clipping values c(k,l), for example, depending on gradient values (e.g., $g_v$, $g_h$, $g_{d1}$, and/or $g_{d2}$) calculated for the block. The geometric transformations applied to the filter coefficients f(k,l) and the corresponding filter clipping values c(k,l) can be equivalent to applying the geometric transformations to samples in a region supported by the filter. The geometric transformations can make different blocks to which an ALF is applied more similar by aligning respective directionality.

Three geometric transformations, including a diagonal flip, a vertical flip, and a rotation can be performed as described by Eqs. (9)-(11), respectively.

$$f_D(k,l)=f(l,k),c_D(k,l)=c(l,k), \qquad \text{Eq. (9)}$$

$$f_v(k,l)=f(k,K-l-1),c_v(k,l)=c(k,K-l-1) \qquad \text{Eq. (10)}$$

$$f_R(k,l)=f(K-l-1,k),c_R(k,l)=c(K-l-1,k) \qquad \text{Eq. (11)}$$

where K is a size of the ALF or the filter, and $0 \le k$, $1 \le K-1$ are coordinates of coefficients. For example, a location (0,0) is at an upper left corner and a location (K−1, K−1) is at a lower right corner of the filter f or a clipping value matrix (or clipping matrix) c. The transformations can be applied to the filter coefficients f (k, l) and the clipping values c(k,l) depending on the gradient values calculated for the block. An example of a relationship between the transformation and the four gradients are summarized in Table 1.

TABLE 1

| Mapping of the gradient calculated for a block and the transformation | |
| --- | --- |
| Gradient values | Transformation |
| $g_{d2} < g_{d1}$ and $g_h < g_v$ | No transformation |
| $g_{d2} < g_{d1}$ and $g_v < g_h$ | Diagonal flip |
| $g_{d1} < g_{d2}$ and $g_h < g_v$ | Vertical flip |
| $g_{d1} < g_{d2}$ and $g_v < g_h$ | Rotation |

In an embodiment, such as in explorative compression model 5 (ECM5), ALF gradient subsampling and ALF virtual boundary processing are not used. A block size for classification can be reduced, for example, from 4×4 to 2×2. A filter size for a luma component and a chroma component, for which ALF coefficients are signaled, can be increased to 9×9 (e.g., a 9×9 diamond shape). To filter a luma sample, different classifiers such as three different classifiers $C_0$, $C_1$ and $C_A$ and different sets of filters such as three different sets of filters $F_0$, $F_1$ and $F_A$ can be used. The three classifiers $C_0$, $C_1$, and $C_A$ can correspond to the three sets of filters $F_0$, $F_1$ and $F_A$, respectively. The sets of filters $F_0$ and $F_1$ can include fixed filters (e.g., stored in a decoder and an encoder) with coefficients trained for the classifiers $C_0$ and $C_1$. In an example, the sets of filters $F_0$ and $F_1$ are not signaled. The set of filters $F_A$ can be referred to as adaptive filters. Coefficients of the set of filters $F_A$ (e.g., an ALF) can be signaled. Which filter from a set (e.g., $F_0$, $F_1$, or $F_A$) is used for a given sample (or a current sample) R(x0, y0) can be determined by a class (e.g., $C_0$, $C_1$, or $C_A$) assigned to the sample using the classifier (e.g., $C_0$, $C_1$, or $C_A$). In an example, two fixed filters $F_0$ and $F_1$ (e.g., two 13×13 diamond shape fixed filters $F_0$ and $F_1$) are applied to derive two intermediate outputs, e.g., including respective intermediate samples $R_0(x,y)$ and $R_1(x,y)$, respectively. The filter (or the adaptive filter) $F_A$ can be applied to $R_0(x,y)$, $R_1(x,y)$, and neighboring samples of the current sample R(x0,y0) to determine a filtered sample $\tilde{R}(x0, y0)$ as below.

$$\tilde{R}(x0,y0)=R(x0,y0)+[\Sigma_{i=0}^{19}c_i(f_{i,0}+f_{i,1})]+[\Sigma_{i=20}^{21}c_ig_i] \qquad \text{Eq. (12)}$$

where $f_{i,j}$ (e.g., $f_{i,0}$ or $f_{i,1}$) can be difference (e.g., a clipped difference) between a neighboring sample and the current sample R(x0,y0) where i is from 0 to 19. A position of the neighboring sample corresponds to a position of the filtering coefficient $c_i$. $g_i$ can be a clipped difference between $R_{i-20}$ (x0, y0) and the current sample R(x0, y0) where i is from 20 to 21. For example, $g_i$=clip $(R_{i-20}(x0,y0)-R(x0, y0))$, and thus $g_{20}$=clip $(R_0(x0,y0)-R(x0, y0))$ and $g_{21}$=clip $(R_1(x0, y0)-R(x0, y0))$. Coefficients of the filter $F_A$ can include $c_i$, i=0, . . . 21. The filter coefficients $c_i$, i=0, . . . 21, can be signalled.

In an embodiment, such as ECM5, a class indicated by a classifier C, (e.g., $C_0$, $C_1$, or $C_A$) can be assigned to a block (e.g., each 2×2 block) based on a directionality (or a directionality parameter) $D_i$ and an activity $\hat{A}_i$ (or a quantized value $\hat{A}_i$ of an activity) as shown in Eq. (13) where i can be 0, 1, or A.

$$C_i=\hat{A}_i*M_{D,i}+D_i \qquad \text{Eq. (13)}$$

where $M_{D,i}$ can represent a total number of directionalities $D_i$. In an example, a class $C_0$ determined by Eq. (13) indicates a filter in the set of filters $F_0$. A class $C_1$ determined by Eq. (13) indicates a filter in the set of filters $F_1$. A class $C_A$ determined by Eq. (13) indicates a filter in the set of filters $F_A$.

Similar to the description related to Eqs. (1)-(5), such as in VVC, values of a horizontal gradient $g_h{}^i$, a vertical gradient $g_v{}^i$, and two diagonal gradients $g_{d1}{}^i$ and $g_{d2}{}^i$ can be calculated for each sample using 1-D Laplacian where i can be 0, 1, or A that correspond to the classifier $C_0$, $C_1$, or $C_A$. A sum of the sample gradients within a window (e.g., a 4×4 window) that covers the target block (e.g., the target 2×2 block) can be used for the classifier $C_0$ (e.g., i=0). A sum of the sample gradients within a window (e.g., a 12×12 window) can be used for the classifiers $C_1$ (e.g., i=1) and $C_A$ (e.g., i being A). The sums of horizontal, vertical and two diagonal gradients are denoted, respectively, as $g_h{}^i$, $g_v{}^i$, $g_{d1}{}^i$ and $g_{d2}{}^i$. The directionality $D_i$ can be determined by comparing $r_{h,v}{}^i$ and $r_{d1,d2}{}^i$ with a set of thresholds.

$$r_{h,v}^j = \frac{\max(g_h^j, g_v^j)}{\min(g_h^j, g_v^j)}, \; r_{d1,d2}^j = \frac{\max(g_{d1}^j, g_{d2}^j)}{\min(g_{d1}^j, g_{d2}^j)} \qquad \text{Eq. (14)}$$

The directionality $D_A$ can be derived, for example, as in VVC using two thresholds (e.g., 2 and 4.5). For the directionalities $D_0$ and $D_1$, an edge strength (e.g., a horizontal over vertical edge strength) $E_{HV}{}^i$ and an edge strength (e.g., a diagonal edge strength) $E_D{}^i$ can be calculated. Thresholds Th=[1.25, 1.5, 2, 3, 4.5, 8] can be used where Th[0] to Th[5] are 1.25, 1.5, 2, 3, 4.5, and 8, respectively. The edge strength $E_{HV}{}^i$ can be 0 if $r_{h,v}{}^i \leq$ Th[0]; otherwise, the edge strength $E_{HV}{}^i$ can be the maximum integer such that $r_{h,v}{}^i >$ Th[$E_{HV}{}^i-$1]. The edge strength $E_D{}^i$ can be 0 if $r_{d1,d2}{}^i \leq$ Th[0]; otherwise, the edge strength $E_D{}^i$ can be the maximum integer such that $r_{d1,d2}{}^i >$ Th[$E_D{}^i-$1] When $r_{h,v}{}^i > r_{d1,d2}{}^i$, i.e., the horizontal/vertical edges are dominant, $D_i$ can be derived using FIG. 7A; otherwise, $r_{h,v}{}^i \leq r_{d1,d2}{}^i$ the diagonal edges are dominant, $D_i$ can be derived by using FIG. 7B.

To obtain $\hat{A}_i$, a sum of vertical and horizontal gradients $A_i$ can be mapped (e.g., quantized) to a range of 0 to n, where n is equal to 4 for $\hat{A}_A$ and n is equal to 15 for $\hat{A}_0$ and $\hat{A}_1$. In some examples, in an APS (e.g., an ALF_APS) that includes ALF filter coefficients, up to 4 luma filter sets can be signaled, and each set may have up to 25 filters.

The class $C_A$ based on Eq. (13) and corresponding to the adaptive filter set $F_A$ can be calculated based on gradients, and thus can be referred to as a gradient-based classifier. Classification in an ALF can be extended with an alternative classifier, such as a band-based classifier. For a signaled luma filter set, a flag can be signaled to indicate whether the alternative classifier (e.g., the band-based classifier) is applied. A geometrical transformation is not applied to the alternative band-based classifier. When the band-based classifier is applied, a sum of sample values of a block (e.g., a 2×2 luma block) can be calculated. The class index (or $\text{class}_{index}$) can be calculated using Eq. (15).

$$\text{class}_{index} = (\text{sum} \times 25) >> (\text{sample bitdepth} + 2) \qquad \text{Eq. (15)}$$

The sample bitdepth indicates a number of bits per sample. In an example, a class index such as the class index determined using Eq. (15) can indicate a filter in the adaptive filter set $F_A$.

Figure 8:
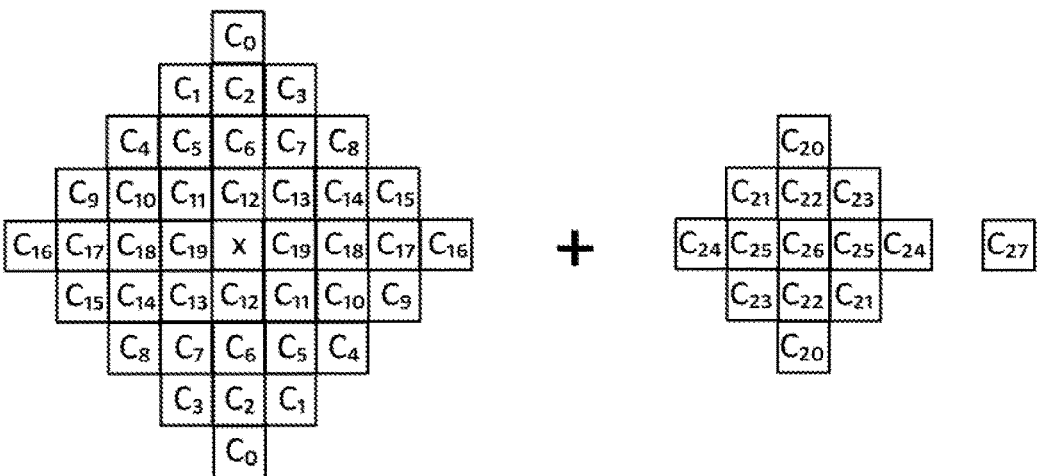
FIGS. 8-11 show examples of filters according to embodiments of the disclosure.

The offline-filtering taps can be extended for an ALF. Offline-filtered taps can provide additional information for ALF luma filtering. In an example, an extension of offline-filtered taps is used to enhance the performance of an ALF. FIG. 8 shows an example of an extended filter including filtering taps (or filtering coefficients). The extended filter in FIG. 8 can be an adaptive filter (e.g., an ALF) that is extended, for example, from a filter in the adaptive filter set $F_A$ described above. The filtering taps in the adaptive filter shown in FIG. 8 can include first taps or first coefficients (e.g., also referred to as spatial taps) including $c_0$ to $c_{19}$ and second taps or second coefficients including $c_{20}$ to $c_{27}$. In the example shown in FIG. 8, the spatial taps (e.g., $c_0$ to $c_{19}$) are kept the same with a diamond shape (e.g., $c_0$ to $c_{19}$ in FIG. 8 correspond to $c_0$ to $c_{19}$ in Eq. 12), and a number of the second taps (e.g., $c_{20}$ to $c_{27}$) applied to results (or outputs) (e.g., $R_0$ and $R_1$) from fixed filters (e.g., $F_0$ and $F_1$) is increased, for example, from 2 (e.g., $c_{20}$ to $c_{21}$) in Eq. 12 to 8 (e.g., $c_{20}$ to $c_{27}$) in FIG. 8. The second taps (e.g., $c_{20}$ to $c_{27}$) can be applied to outputs/results of the fixed filter(s), and thus can be referred to as fixed-filter results based taps. In an example, the coefficients $c_{20}$ to $c_{26}$ are applied to $R_0$, and the coefficient $c_{27}$ is applied to $R_1$. In various examples, the adaptive filter including the filtering taps $c_0$ to $c_{27}$ is signaled.

In related technologies, such as shown in FIG. 8, both the first taps (e.g., the spatial filter taps such as $c_0$ to $c_{19}$) and the second taps (e.g., $c_{20}$ to $c_{27}$) that are applied to offline filtered results or samples are used to filter a sample. The additional taps or coefficients (e.g., $c_{22}$ to $c_{27}$) can improve coding performance, for example, the filtered sample from the filter in FIG. 8 may be more accurate (e.g., having a larger signal-to-noise-ratio (SNR)) than the filtered sample from the filter in Eq. 12. Comparing filtering coefficients in FIG. 8 and Eq. 12, more coefficients (e.g., $c_{21}$ to $c_{27}$) need to be signaled in the example of FIG. 8, and thus using the filter shown in FIG. 8 may not maximize the coding efficiency.

Aspects of the disclosure provide techniques for an ALF on offline fixed filtering. The techniques for can combine the ALF (e.g., $F_A$) and offline trained filter(s) (e.g., $F_0$ and/or $F_1$) used in the ALF. The ALF can be performed on an image or a picture filtered with offline trained filter(s) (e.g., $F_0$, $F_1$, and/or the like) including the offline trained fixed filter taps.

Embodiments of the disclosure describes a filtering process. First filtering (e.g., filtering by fixed filter(s)) in the filtering process can be applied to samples, such as samples in a picture, using one or more first filters (e.g., one or more fixed filters) and determine one or more corresponding first filtered outputs. A second filter (or a second adaptive filter with changeable coefficients) in the filtering process can be applied to the one or more first filtered outputs to determine a second filtered output (also referred to as a final filtered output). For example, the samples in the picture can include a current sample to be filtered by the second filter, and the second filter is applied to the one or more first filtered outputs to obtain a second filtered sample of the current sample. According to an embodiment of the disclosure, each coefficient of the second filter can be applied to a corresponding one of the one or more first filtered outputs. For example, each coefficient of the second filter is applied (i) directly to the corresponding one of the one or more first filtered outputs or (ii) indirectly to a result (e.g., a difference such as a clipped difference) that is based on the corresponding one of the one or more first filtered outputs.

In some examples, one or more second adaptive filters are applied to the one or more corresponding first filtered outputs.

In an example, the samples in the picture include samples associated with the current sample, such as samples in a region (e.g., a surrounding region) that surrounds the current sample.

In an embodiment, a filter of the one or more first filters is from a pre-defined filter set. In an example, the second filter is selected from an adaptive filter set signaled in the bitstream.

The samples (e.g., indicated by R(x, y)) in the picture prior to the first filtering can be referred to as unfiltered samples since the samples are not filtered by the one or more first filters or the second filter. The unfiltered samples (e.g., indicated by R(x, y)) may have been filtered by other filter(s), such as a SAO filter. Each of the one or more first filtered outputs can include first filtered samples that correspond to the unfiltered samples in the picture, respectively. The filtering process described above can include (i) the first filtering step where the one or more first filters are applied to the unfiltered samples in the picture and (ii) the second filtering step where the second filter is applied to the one or more first filtered outputs (e.g., including the respective first filtered samples in the picture). The filtering process including the first filtering step and the second filtering step can be referred to as a complete two-step filtering process where each coefficient of the second filter is applied to a first filtered sample or a difference (e.g., a difference or a clipped difference) between (i) the first filtered sample and (ii) a corresponding unfiltered sample that are located at a same location in the picture.

The filtering process (e.g., the complete two-step filtering process) can be applied to filter sample(s) in any suitable block, such as a luma block, a chroma block, an inter-predicted block, an intra-predicted block, or the like.

In related filtering process(es), such as the filtering described in Eq. (12), samples in a picture are filtered by fixed filters $F_0$ and $F_1$ and then by the adaptive filter $F_A$. However, only a subset (e.g., $c_{20}$ to $c_{21}$) of coefficients of the adaptive filter $F_A$ is applied to outputs (e.g., $R_0$ and $R_1$) from the fixed filters $F_0$ and $F_1$, and other coefficients (e.g., $c_0$ to $c_{19}$) of the adaptive filter $F_A$ are applied to the unfiltered samples, such as differences (e.g., clipped differences) between respective neighboring samples (i.e., unfiltered neighboring samples) and the current sample (e.g., the unfiltered current sample).

Figure 9:
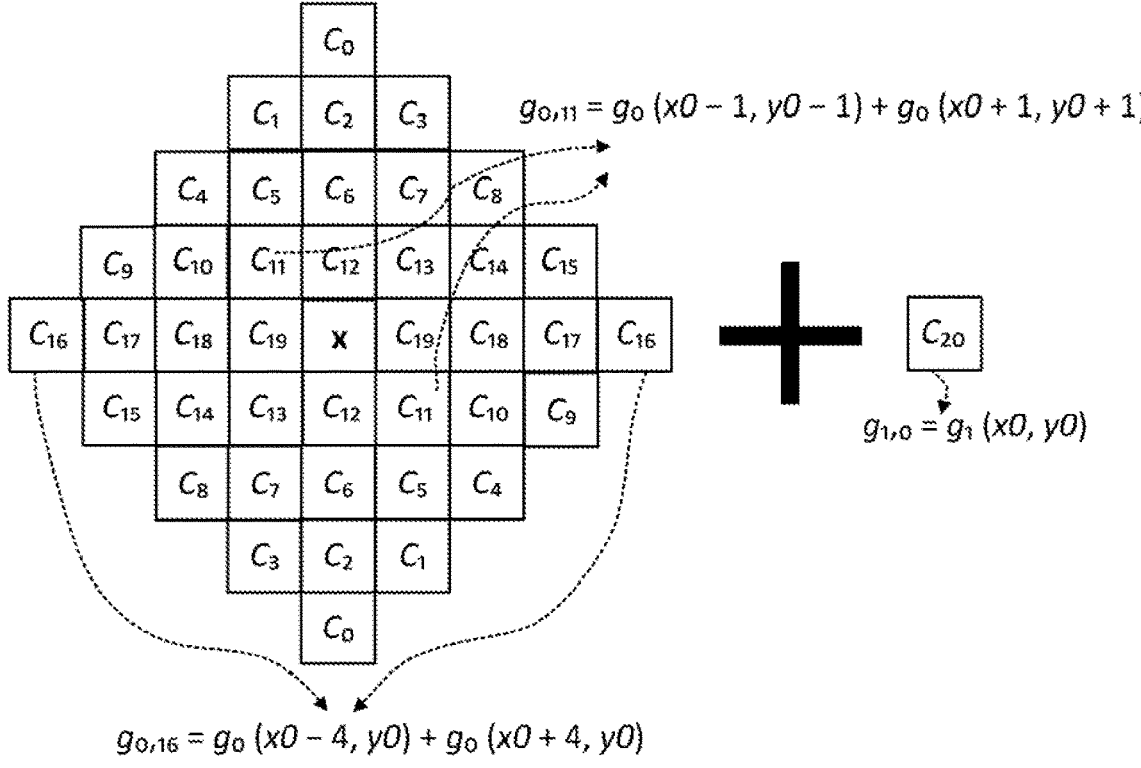
Figure 10:
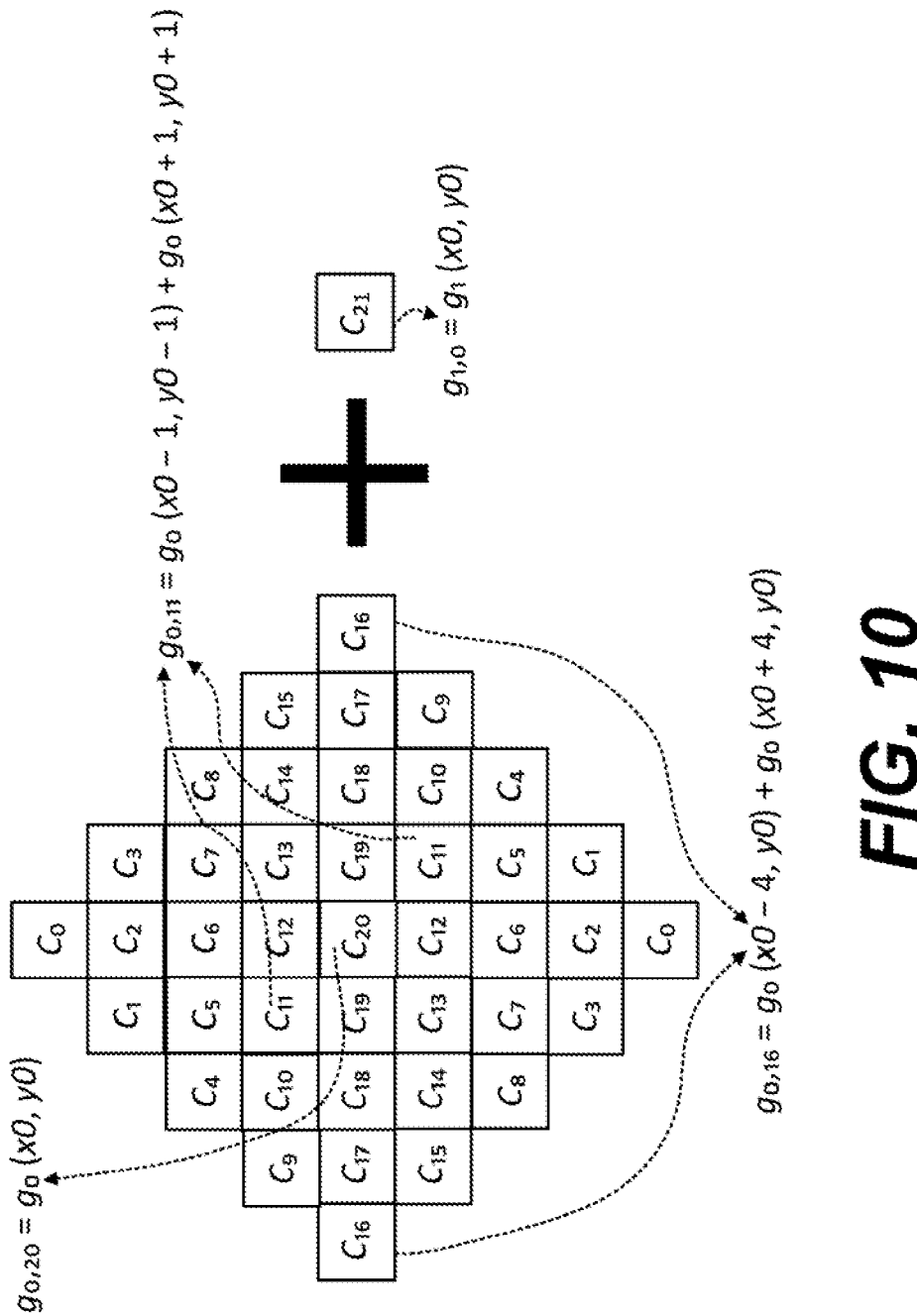
Figure 11:
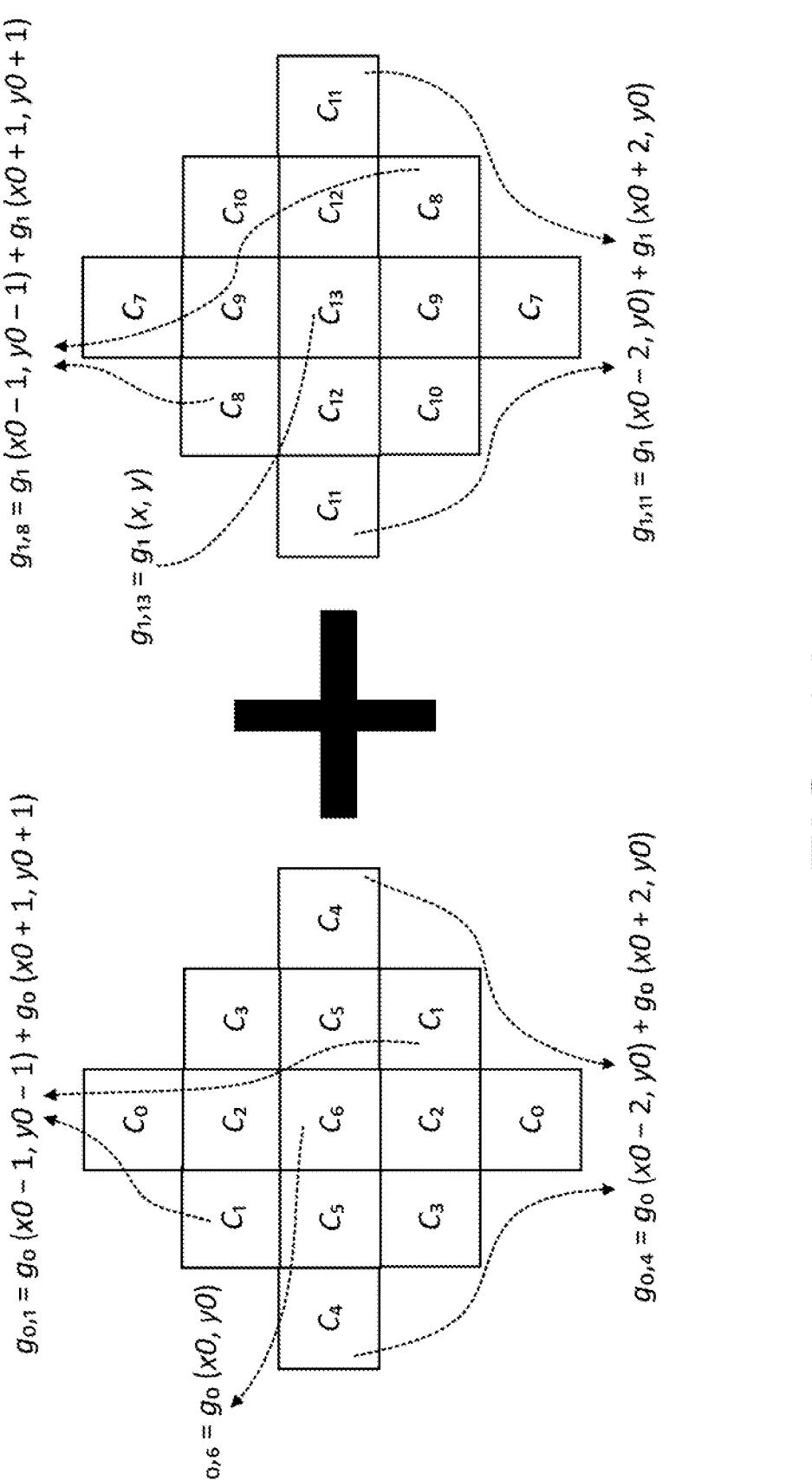

The complete two-step filtering process can be more beneficial for video/image coding compared with related filtering process(es), such as the filtering described in Eq. (12). In the complete two-step filtering process, the second filter can be applied to the first filtered output(s), and the first filtered output(s) can have a larger SNR than the unfiltered samples. Thus, the second filter used in the complete two-step filtering process can include less coefficients than those used in the adaptive filter $F_A$ in Eq. (12) and can achieve similar or better SNR than the adaptive filter $F_A$ in Eq. (12). Accordingly, the complete two-step filtering process can achieve similar or better SNR than the adaptive filter $F_A$ in Eq. (12) and can be more coding efficient (e.g., signaling less coefficients). For example, adaptive filters $F_A$ shown in FIGS. 9-11 are used in the complete two-step filtering process, numbers of coefficients in the adaptive filters $F_A$ shown in FIGS. 9-11 are 21, 22, and 13, respectively, which are less than the number (e.g., 28) of coefficients in the adaptive filter $F_A$ shown in FIG. 8.

The one or more first filters can be nonlinear filter(s) that modify sample(s) in the picture nonlinearly. The one or more first filters can be predefined. The one or more first filters can be known to or can be stored in an image coder or a video coder, such as a decoder, an encoder, and/or the like. The one or more first filters can include fixed filter(s) (e.g., offline fixed filters) with coefficients trained offline, such as $F_0$ and $F_1$ described above, and the one or more first filtered outputs can include $R_0$ and $R_1$ described above.

In an example, each of the one or more first filters is selected from a fixed filter set based on a respective classifier. The one or more first filters can include p filter(s) (e.g., p fixed filters) with coefficients trained for a corresponding classifiers $C_i$, where p is a positive number and i can be from 0 to p−1. The p filter(s) can include a filter from multiple fixed filters $F_0$, a filter from multiple fixed filters $F_1$, . . . , and a filter from multiple fixed filters $F_{p-1}$. For purposes of brevity, the p filter(s) can be referred to as the fixed filter(s) $F_0$, $F_1$, . . . , and $F_{p-1}$. Coefficients of the multiple fixed filters $F_0$, the multiple fixed filters $F_1$, . . . , and the multiple fixed filters $F_{p-1}$ can be predefined and, for example, are not signaled. Corresponding classifiers $C_i$ can be determined using Eq. (13). Each of the fixed filter(s) (e.g., $F_0$, $F_1$, . . . , or $F_{p-1}$) can be selected based on the respective classifiers $C_i$ from the respective multiple fixed filters $F_i$. In an example, the p filter(s) include two first filters. One first filter is selected from the multiple fixed filters $F_0$ based on a classifier $C_0$, and another first filter is selected from the multiple fixed filters $F_1$ based on a classifier $C_1$ as described in Eq. (13).

The second filter can be selected from multiple adaptive filters (e.g., multiple ALF filters) $F_A$ based on a classifier $C_A$. In an example, a class indicated by a classifier $C_i$ (e.g., $C_0$, $C_1$, . . . , $C_{p-1}$) or $C_A$ is assigned to a block in the picture. The block can have any suitable size, such as 2×2, 4×4, or the like. In an example, the size of the block is 1×1, and the class indicated by the classifier $C_i$ or $C_A$ is assigned to a sample in the picture.

In an example, coefficients of the multiple adaptive filters (e.g., multiple ALF filters) $F_A$ are signaled in header(s), such as $N_A$ APS(s), where $N_A$ is a positive integer (e.g., 8). An APS for multiple blocks (e.g., such as the multiple blocks in a slice or in a picture) can be selected from the $N_A$ APS(s) (e.g., an APS being selected from 8 APSs). Then, the classifier $C_A$ (e.g., the classifier $C_A$ per block or per sample) is determined based on Eq. (13) or Eq. (15), and the second filter for the block (or for the sample) is selected based on the classifier $C_A$ from the multiple adaptive filters signaled in the selected APS.

In an example, the one or more first filters (e.g., the p filter(s)) include constant filter coefficients and are not signaled, and the second filter includes filter coefficients that can be changed and are signaled in a bitstream, such as in APS(s).

In an embodiment, two different types of filters (e.g., cF and aF) are used in the filtering process (e.g., the complete two-step filtering process). The first type of filters cF can include the p filter(s) described above. The second type of filters aF can include adaptive filters, such as the multiple adaptive filters (e.g., the multiple ALF filters) $F_A$ described above. Coefficients of the second type of filters aF can be signaled. Which filter (e.g., which adaptive filter) from the second type of filters aF is used for the current sample can be determined by a class assigned to the current sample using the classifier $C_A$.

In an example, the first type of filters cF (e.g., the p fixed filters) are applied to derive intermediate filtered output(s) (also referred to as first filtered output(s)), such as $R_0$, $R_1$, . . . , and $R_{p-1}$ from the respective filter(s) $F_0$, $F_1$, . . . , and $F_{p-1}$, for the samples in the picture. Each first filtered output can include intermediate filtered samples or first filtered samples (e.g., $R_0(x, y)$, $R_1(x, y)$, . . . , or $R_{p-1}(x, y)$) corresponding to the samples in the picture. (x, y) can refer to a sample position in the picture. R(x, y) can indicate an input sample (or an unfiltered sample) located at a coordinate (or a position) (x, y) before applying ALF filtering (e.g., including the first type of filters cF and the second type of filter aF). The input sample (or the unfiltered sample) indicated by R(x, y) can be an input sample to $F_0$, $F_1$, . . . , or $F_{p-1}$. As described above, R(x, y) may have been filtered by other filters (e.g., a SAO filter) that are different from the two different types of filters (e.g., cF and aF) used in the complete 2-step filtering process.

After deriving the intermediate filtered output(s), the second filter (e.g., a filter in aF) can be applied to $R_0(x, y)$, $R_1(x, y)$, . . . , or $R_{p-1}(x, y)$) to derive a filtered current sample $\tilde{R}(x0, y0)$ as $$\tilde{R}(x0, y0) = R(x0, y0) + \left[ \sum_{i=0}^{n-1} c_i g_{k,i} \right] + \left[ \sum_{i=n}^{n+p-2} c_i g_{m,0}, \left\{ \begin{array}{l} \text{if } i - n < k, m = i - n \\ \text{otherwise}, m = i - n + 1 \end{array} \right] \right]$$

Eq. (16)

where $k \epsilon p$ (e.g., $\{0, 1, \ldots p-1\}$), $m \epsilon p$, and $k \neq m$. The second filter can include filter coefficients or coefficients $c_i$, i=0, . . . , n+p−2. The filter coefficient $c_i$ (i=0, . . . , n−1) can be associated with $g_{k,i}$. The filter coefficients $c_i$, i=0, . . . , n+p−2, can be signaled. Positions of the samples in the picture can be represented by (x, y). The samples in the picture can include the current sample. (x0, y0) can represent a position of the current sample, R(x0, y0) can represent the unfiltered current sample, e.g., a value of the current sample prior to applying the first type of filters cF and the second filter. $\tilde{R}(x0, y0)$ can represent the final filtered sample (or the second filtered sample) of the current sample. $\tilde{R}(x0, y0)$ can be the final filtered sample after applying both the first type of filters cF and the second filter.

$g_{m,0}$ can represent a difference (e.g., a clipped difference) between the first filtered current sample $R_m(x0, y0)$ and the unfiltered current sample R(x0, y0). $g_{k,i}$ can represent a sum of difference(s) (e.g., clipped difference(s)) between unfiltered sample(s) R(x,y) and corresponding first filtered sample(s) $R_k(x, y)$ at sample position(s) (also referred to as filtering position(s)) i that correspond to the coefficient $c_i$. i can point to one or multiple sample positions (x,y) that are at the current sample position (x0, y0) or around (x0, y0), and i=0, . . . , n−1. Referring to Eq. (16), each coefficient of the second filter is applied to a corresponding first filtered output. For example, each $c_i$ of the coefficients $c_0$ to $c_{n-1}$ is directly applied to $g_{k,i}$ and thus is indirectly applied to the first filtered output $R_k(x,y)$ at position(s) (x, y) that are associated with $c_i$. Each $c_i$ of the coefficients $C_n$ to $c_{n+p-2}$ is directly applied to $g_{m,0}$ and thus is indirectly applied to the first filtered output $R_m(x0, y0)$ at the current sample position (x0, y0) that are associated with $c_i$.

In an embodiment, k is a predefined constant parameter, such as 0, 1, 2, 3, or the like. A picture, a slice, a CTU, a class indicated by a classifier, or the like can have a respective k value. In another embodiment, k is signaled in a syntax at a suitable level or a suitable header, such as a CTU level, in a slice header, a picture header, an SPS, a PPS, or the like.

Referring to Eq. (16), in an embodiment, the one or more first filters include a first filter (e.g., $F_0$). A first filtered output (e.g., $R_0$) in the one or more first filtered outputs can include the first filtered samples (e.g., $R_0(x, y)$) from the first filter. A plurality of coefficients (e.g., $c_0$ to $c_{n-1}$ in Eq. (16)) of the second filter can be applied to the first filtered output. In an example, the one or more first filters include at least another first filter (e.g., $F_1$), the one or more first filtered outputs includes at least another first filtered output (e.g., $R_1$), and at least one coefficient (e.g., $c_n$ in Eq. (16)) of the second filter that is different from the plurality of coefficients can be applied to each of the at least another first filtered output.

In an example, k is 0, and Eq. (16) can become Eq. (17) below.

$$\tilde{R}(x0,y0) = R(x0,y0) + [\Sigma_{i=0}^{n-1} c_i g_{0,i}] + c_n g_{1,0} + c_{n+1} g_{2,0} + \ldots + c_{n+p-2} g_{p-1,0}$$

Eq. (17)

Referring to Eq. (17), the first filter can be $F_0$, the first filtered output can be $R_0$. $g_{0,i}$ can represent a sum of difference(s) (e.g., clipped difference(s)) between unfiltered sample(s) R(x,y) and corresponding first filtered sample(s) $R_0(x,y)$ at sample position(s) i that are associated with the coefficients $c_0$ to $c_{n-1}$ of the second filter. The plurality of coefficients applied to the first filtered output can include $c_0$ to $c_{n-1}$. The at least another first filter can include $F_1$, . . . , and $F_{p-1}$, the at least another first filtered output can include $R_1$, . . . , and $R_{p-1}$, and a coefficient (e.g., one of $C_n$ to $c_{n+p-2}$ in Eq. (17)) of the second filter can be applied to the respective first filtered output (e.g., one of $R_1$, . . . , and $R_{p-1}$ in Eq. (17)).

In an example, k is 3, and Eq. (16) can become Eq. (18) below.

$$\tilde{R}(x0,y0) = R(x0,y0) + [\Sigma_{i=0}^{n-1} c_i g_{3,8}] + c_n g_{0,0} + c_{n+1} g_{1,0} + c_{n+2} g_{2,0} + c_{n+3} g_{4,0} + C_{n+4} g_{5,0} \ldots + C_{n+p-2} g_{p-1,0}$$

Eq. (18)

Referring to Eq. (18), the first filter can be $F_3$, the first filtered output can be $R_3$. $G_{3,1}$ can represent a sum of difference(s) (e.g., clipped difference(s)) between unfiltered sample(s) R(x,y) and corresponding first filtered sample(s) $R_3(x,y)$ at sample position(s) i that are associated with the coefficients $c_0$ to $c_{n-1}$ of the second filter. The plurality of coefficients applied to the first filtered output can include $c_0$ to $c_{n-1}$.

In an embodiment, three different sets of filters (e.g., $F_0$, $F_1$ and $F_A$) are used. The sets of filters $F_0$ and $F_1$ include fixed filters, with coefficients trained for the classifiers $C_0$ and $C_1$. Coefficients of the filters in $F_A$ can be signaled. In an example, at an encoder, two fixed filters $F_0$ and $F_1$ (e.g., two 13×13 diamond shaped fixed filters $F_0$ and $F_1$) are applied to derive two intermediate filtered outputs including samples $R_0(x, y)$ and $R_1(x,y)$, respectively. Subsequently, the second filter or the adaptive filter $F_A$ can be applied to $R_0(x,y)$ and $R_1(x, y)$ to derive a filtered current sample as below.

$$\tilde{R}(x0,y0) = R(x0,y0) + [\Sigma_{i=20}^{n-2} c_i g_{k,i}] + C_{n-1} g_{1-k,0}$$

Eq. (19)

where $k \epsilon \{0, 1\}$ can be a predefined parameter or can be signaled in a syntax, for example, k is 0 or 1. The second filter can include filter coefficients or coefficients $c_i$, i=0, . . . , n−1. The filter coefficient $c_i$ (i=0, . . . , n−2) can be associated with or applied to $g_{k,i}$. The filter coefficients $c_i$, i=0, . . . , n−1, can be signaled. Positions of the samples in the picture can be represented by (x, y). R(x0, y0) can represent the unfiltered current sample. $\tilde{R}(x0,y0)$ can represent the final filtered current sample after applying the first type of filters (e.g., $F_0$ and $F_1$) and the second filter $F_A$.

$g_{1-k,0}$ can represent a difference (e.g., a clipped difference) between the first filtered current sample $R_{1-k}(x0,y0)$ and the unfiltered current sample R(x0,y0). $g_{k,i}$ can represent a sum of difference(s) (e.g., clipped difference(s)) between unfiltered sample(s) R(x,y) and corresponding first filtered sample(s) $R_k(x, y)$ at sample position(s) (also referred to as filtering position(s)) i. i can point to one or multiple sample positions (x, y) that are at the current sample position (x0, y0) or around (e.g., surrounding) (x0,y0).

In an embodiment, Eq. (19) can become Eq. (20) when k is 0.

$$\tilde{R}(x0,y0)=R(x0,y0)+[\Sigma_{i=0}^{n-2}c_ig_{0,i}]+c_{n-1}g_{1,0} \qquad \text{Eq. (20)}$$

FIG. 9 shows an example of the second filter $F_A$ including filtering taps (or filtering coefficients) $c_i$, i=0, . . . , 20 where n is 21 in Eq. 20. The filtering coefficients in $F_A$ can include first coefficients (e.g., including $c_0$ to $c_{19}$) and a second coefficient (e.g., $c_{20}$). In an example, the first coefficients $c_i$ (e.g., $c_0$ to $c_{19}$) are applied to $g_{0,i}$, i.e., the first filter coefficient $c_i$ is associated with $g_{0,i}$ where i is from 0 to 19 and the second coefficient $c_{20}$ is applied to $g_{1,0}$. In various examples, the adaptive filter including the filtering taps $c_0$ to $c_{20}$ is signaled.

Referring to FIG. 9, a region supported by the second filter $F_A$ can include the position (x0, y0) where the current sample is positioned and a surrounding region of the current sample. The surrounding region can include the samples around (e.g., surrounding) the current sample position (x0, y0). The region supported by the second filter $F_A$ can refer to a region in the picture whose samples (e.g., first filtered samples) can be used to obtain the second filtered current sample using the second filter $F_A$. The second coefficient (e.g., $c_{20}$) can be associated with (x0, y0) that is the location of the current sample, and the first coefficients (e.g., $c_0$ to $c_{19}$) can be associated with the surrounding region of the current sample.

In an example, the region (corresponding to the coefficients $c_0$ to $c_{20}$) supported by the second filter $F_A$ can have a symmetric diamond shape. The surrounding region (corresponding to the coefficients $c_0$ to $c_{19}$) of the current sample can have a symmetric diamond shape.

$g_{1,0}$ (also indicated by $g_1(x,y)$) can be a difference (e.g., a clipped difference) between the first filtered current sample $R_1(x0,y0)$ and the unfiltered current sample R(x0,y0). $g_{0,i}$ can be a sum of differences (e.g., clipped differences) between unfiltered sample(s) R(x, y) and corresponding first filtered sample(s) $R_0(x, y)$ at sample position(s) (or filtering position(s)) i where i is from 0 to 19. i can point to two sample positions that are in the surrounding region of the current sample position (x0,y0). For example, the two sample positions correspond to the same coefficient $c_i$.

Referring to FIG. 9, when i is from 0 to 19, such as 11, the two sample positions correspond to the coefficient $c_i$ (e.g., $c_{11}$) and are positioned at positions associated with $c_i$, such as (x0−1, y0−1) and (x0+1, y0+1) associated with $c_{11}$. For example, $g_{0,11}=g_0(x0-1, y0-1)+g_0(x0+1, y0+1)$. $g_0(x0-1, y0-1)$ can indicate a first difference (e.g., a clipped difference) between R(x0−1, y0−1) and $R_0(x0-1, y0-1)$, and $g_0(x0+1, y0+1)$ can indicate a second difference (e.g., a clipped difference) between R(x0+1, y0+1) and $R_0(x0+1, y0+1)$. Thus, $g_{0,11}$ can be a sum of the first difference and the second difference.

The description above can be applied to i being 0, 1, . . . , or 19. For example, when i is 16, the two sample positions correspond to the coefficient $c_{16}$ and are positioned at positions (x0−4, y0) and (x0+4, y0). Thus, $g_{0,16}=g_0(x0-4, y0)+g_0(x0+4, y0)$. $g_0(x0-4, y0)$ can indicate a difference (e.g., a clipped difference) between R(x0−4, y0) and $R_0(x0-4, y0)$, and $g_0(x0+4, y0)$ can indicate a difference (e.g., a clipped difference) between R(x0+4, y0) and $R_0(x0+4, y0)$.

FIG. 10 shows an example of the second filter $F_A$ including filtering taps (or filtering coefficients) $c_i$, i=0, . . . , 21 where n is 22 in Eq. 20. The filtering coefficients in $F_A$ can include first coefficients (e.g., including $c_0$ to $c_{20}$) and a second coefficient (e.g., $c_{21}$). In an example, the first coefficients $c_0$ to $c_{20}$ are applied to $g_{0,i}$, i.e., the first filter coefficient $c_i$ is associated with $g_{0,i}$ where i is from 0 to 20 and the second coefficient $c_{21}$ is applied to $g_{1,0}$. In various examples, the adaptive filter including the filtering taps $c_0$ to $c_{21}$ is signaled.

The region supported by the second filter $F_A$ in FIG. 10 can be identical to the region supported by the second filter $F_A$ in FIG. 9. Referring to FIG. 10, the second coefficient (e.g., $c_{21}$) can be associated with (x0, y0) that is the location of the current sample, and the first coefficients (e.g., $c_0$ to $c_{20}$) can be associated with the region supported by the second filter $F_A$ which includes the current sample position (x0, y0). In an example, the region supported by the second filter $F_A$ can have a symmetric diamond shape.

$g_{1,0}$ (or $g_1(x, y)$) can be a difference (e.g., a clipped difference) between the first filtered current sample $R_1(x0, y0)$ and the unfiltered current sample R(x0, y0). $g_{0,i}$ can be a sum of difference(s) (e.g., clipped difference(s)) between unfiltered sample(s) R(x, y) and corresponding first filtered sample(s) $R_0(x, y)$ at sample position(s) (or filtering position(s)) i where i is from 0 to 20. i can point to one or two sample positions that are in the surrounding region of the current sample position (x0, y0) or the current sample. For example, the one or two sample positions correspond to the coefficient $c_i$.

Referring to FIG. 10, when i is from 0 to 19, such as 11, the two sample positions correspond to the coefficient $c_i$ (e.g., $c_{11}$) and are positioned at positions associated with $c_i$, such as ($x_{0-1}$, y0−1) and (x0+1, y0+1) associated with $c_{11}$. Thus, $g_{0,11}=g_0(x0-1, y0-1)+g_0(x0+1, y0+1)$ such as described in FIG. 9. The description can be applied to i being 0, 1, . . . , or 19.

Referring to FIG. 10, when i is 20, the sample position (e.g., the current sample position (x0, y0)) corresponds to the coefficient $c_{20}$. Thus, $g_{0,20}=g_0(x0, y0)$. $g_0(x0, y0)$ can indicate a difference (e.g., a clipped difference) between R(x0, y0) and $R_0(x0, y0)$.

In an embodiment, two different sets of filters (e.g., $F_0$ and $F_A$) can be used. The sets of filter $F_0$ and $F_A$ are described above. The fixed filter $F_0$ can be applied to derive an intermediate filtered output including samples $R_0(x, y)$. Subsequently, the second filter or the adaptive filter $F_A$ can be applied to $R_0(x, y)$ to derive a filtered current sample as below.

$$\tilde{R}(x0,y0)=R(x0,y0)+[\Sigma_{i=0}^{n-1}c_ig_{0,i}] \qquad \text{Eq. (21)}$$

In an example, the coefficients $c_0$ to $c_{n-1}$ are applied to $g_{0,i}$, i.e., the filter coefficient $c_i$ is associated with $g_{0,i}$ where i is from 0 to n−1. In various examples, the adaptive filter including the filtering taps $c_0$ to $c_{n-1}$ is signaled. $g_{0,i}$ can be a sum of differences (e.g., clipped differences) between unfiltered sample(s) R(x, y) and corresponding first filtered sample(s) $R_0(x, y)$ at sample position(s) (or filtering position(s)) i. i can point to one or more sample positions that are in the surrounding region of the current sample position (x0, y0) or at the current sample position, such as described in FIG. 9 or 10. For example, the one or more sample positions correspond to the coefficient $c_i$.

In an embodiment, the two different types of filters (e.g., cF and aF) are used in the filtering process (e.g., the complete two-step filtering process). The first type of filters cF can include the p filter(s) described above. The second type of filters aF can include adaptive filters, such as the multiple adaptive filters (e.g., the multiple ALF filters) $F_A$ described above. Coefficients of the second type of filters aF can be signaled. Which filter (e.g., which adaptive filter)

from the second type of filters aF is used for the current sample can be determined by a class assigned to the current sample using the classifier $C_A$.

In an example, the first type of filters cF (e.g., the p fixed filters) are applied to derive intermediate filtered output(s) (also referred to as first filtered output(s)), such as $R_0$, $R_1$, . . . , and $R_{p-1}$ from the respective filter(s) $F_0$, $F_1$, . . . , and $F_{p-1}$, for the samples in the picture such as described above. Each first filtered output can include intermediate filtered samples or first filtered samples (e.g., $R_0(x, y)$, $R_1(x, y)$, . . . , or $R_{p-1}(x, y)$) corresponding to the samples in the picture. (x, y) can refer to a sample position in the picture. After deriving the intermediate filtered output(s), the second filter (e.g., a filter in aF) can be applied to $R_0(x, y)$, $R_1(x, y)$, . . . , or $R_{p-1}(x, y)$ to derive a filtered current sample R(x0, y0) as $$\tilde{R}(x0,y0)=R(x0,y0)+[\Sigma_{i=0}^{n0-1}c_ig_{0,i}]+[\Sigma_{i=n_0}^{n0+n1-1}c_ig_{1,i}]+[\Sigma_{i=n_0+n_1}^{n0+n1+n2-1}c_ig_{2,i}]+\ . \ . \ . \ +$$

$$[\Sigma_{i=n_0+\ . \ . \ . \ +n_{p-2}}^{n0+\ . \ . \ . \ +n_{p-2}+n_{p-1}-1}c_ig_{p-1,i}] \qquad \text{Eq. (22)}$$

where $k \epsilon p$ (e.g., $\{0, 1, . . . p-1\}$). The second filter can include filter coefficients or coefficients $c_i$, i=0, . . . , $(n_0+n_1+ \ . \ . \ . \ n_{p-2}+n_{p-1}-1)$. The filter coefficient $c_i$ can be associated with $g_{k,i}$. The filter coefficients $c_i$, i=0, . . . , $(n_0+n_1+ \ . \ . \ . \ n_{p-2}+n_{p-1}-1)$, can be signaled. Positions of the samples in the picture can be represented by (x, y). The samples in the picture can include the current sample. (x0, y0) can represent a position of the current sample, R(x0, y0) can represent the unfiltered current sample. $\tilde{R}(x0, y0)$ can represent the final filtered sample (or the second filtered sample) after applying the first type of filters cF and the second filter. $g_{k,i}$ can represent a sum of difference(s) (e.g., clipped difference(s)) between unfiltered sample(s) R(x, y) and corresponding first filtered sample(s) $R_k(x, y)$ at sample position(s) (also referred to as filtering position(s)) i. i can point to one or multiple sample positions (x, y) that are at the current sample position (x0, y0) or around (x0, y0).

Referring to Eq. (22), in an example, one or more coefficients can be applied to a first filtered output $R_k$. For example, no coefficient(s) are applied to the first filtered output $R_0$ via the term $g_{0,i}$, $n_1$ coefficient(s) are applied to the first filtered output $R_1$ via the term $g_{1,i}$, . . . , and $n_{p-1}$ coefficient(s) are applied to the first filtered output $R_{p-1}$ via the term $g_{p-1,i}$.

In an embodiment, three different sets of filters (e.g., $F_0$, $F_1$ and $F_A$ such as described above) are used. For example, the sets of filters $F_0$ and $F_1$ include fixed filters, with coefficients trained for the classifiers $C_0$ and $C_1$. Coefficients of the filters in $F_A$ can be signaled. In an example, the filters $F_0$ and $F_1$ (e.g., two 13×13 diamond shaped fixed filters $F_0$ and $F_1$) are applied to derive two intermediate filtered outputs including samples $R_0(x, y)$ and $R_1(x, y)$, respectively. Subsequently, the second filter or the adaptive filter $F_A$ can be applied to $R_0(x, y)$ and $R_1(x, y)$ to derive a filtered current sample as below.

$$\tilde{R}(x0,y0)=R(x0,y0)+[\Sigma_{i=0}^{m-1}c_ig_{0,i}]+[\Sigma_{i=m}^{n-1}c_ig_{1,i}] \qquad \text{Eq. (23)}$$

where 0<m<n and $k\epsilon\{0, 1\}$. The second filter can include filter coefficients or coefficients $c_i$, i=0, . . . , n−1. The filter coefficient $c_i$ can be associated with or applied to $g_{k,i}$. The filter coefficients $c_i$, i=0, . . . , n−1, can be signaled. Positions of the samples in the picture can be represented by (x, y). $\tilde{R}(x0, y0)$ can represent the unfiltered current sample. $\tilde{R}(x0, y0)$ can represent the final filtered current sample after applying the first type of filters (e.g., $F_0$ and $F_1$) and the second filter $F_A$. $g_{k,i}$ can represent a sum of difference(s)

(e.g., clipped difference(s)) between unfiltered sample(s) R(x, y) and corresponding first filtered sample(s) $R_k(x, y)$ at sample position(s) (also referred to as filtering position(s)) i. i can point to one or multiple sample positions (x, y) that are at the current sample position (x0, y0) or around (x0, y0).

FIG. 11 shows an example of the second filter $F_A$ including filtering taps (or filtering coefficients) $c_i$, i=0, . . . , n−1 where m is 7 and n is 14 in Eq. 23. The filtering coefficients in $F_A$ can include first coefficients (e.g., including $c_0$ to $c_6$) and second coefficients (e.g., including $c_7$ to $c_{13}$). In an example, the first coefficients (e.g., including $c_0$ to $c_6$) are applied to $g_{0,i}$, i.e., the filter coefficient $c_i$ is associated with $g_{0,i}$ where i is from 0 to 6 and the second coefficients (e.g., including $c_7$ to $c_{13}$) are applied to $g_{1,i}$ where i is from 7 to 13. In various examples, the adaptive filter including the filtering taps $c_0$ to $c_{13}$ is signaled.

The region supported by the second filter $F_A$ in FIG. 11 can be diamond shaped. Referring to FIG. 11, the first coefficients (e.g., $c_0$ to $c_6$) and the second coefficients (e.g., including $c_7$ to $c_{13}$) can be associated with the region supported by the second filter $F_A$ which includes the current sample position (x0, y0) and the surrounding region.

$g_{k,i}$ (e.g., $g_{0,i}$ or $g_{1,i}$) can be a sum of difference(s) (e.g., clipped difference(s)) between unfiltered sample(s) R(x, y) and corresponding first filtered sample(s) $R_k(x, y)$ (e.g., $R_0(x, y)$ or $R_1(x, y)$) sample position(s) (or filtering position(s)) i. i can point to one or two sample positions that are in the surrounding region of the current sample position (x0, y0) or the current sample. For example, the one or two sample positions correspond to the coefficient $c_i$.

Referring to FIG. 11, the first coefficients include $c_0$ to $c_6$. When i is from 0 to 5, such as 1, the two sample positions correspond to the coefficient $c_i$ (e.g., $c_i$) and are positioned at positions associated with $c_i$, such as $(x_{0-1}, y0-1)$ and (x0+1, y0+1) associated with $c_i$. Thus, $g_{0,1}=g_0(x0-1, y0-1)+g_0(x0+1, y0+1)$, such as described in FIGS. 9-10. The description can be applied to i being 0, 1, . . . , or 5. When i is 4, the two sample positions correspond to the coefficient $c_i$ (e.g., $c_4$) and are positioned at positions associated with $c_i$, such as (x0-2, y0) and (x0+2, y0) associated with $c_4$. Thus, $g_{0,4}=g_0(x0-2, y0)+g_0(x0+2, y0)$, such as described in FIGS. 9-10. When i is 6, the sample position (e.g., the current sample position (x0, y0)) corresponds to the coefficient $c_6$. Thus, $g_{0,6}=g_0(x0, y0)$. $g_0(x0, y0)$ can indicate a difference (e.g., a clipped difference) between R(x0, y0) and $R_0(x0, y0)$.

Referring to FIG. 11, the second coefficients include the coefficients $c_7$ to $c_{13}$. When i is from 7 to 12, such as 8, the two sample positions correspond to the coefficient $c_i$ (e.g., $c_1$) and are positioned at positions associated with $c_i$, such as $(x_{0-1}, y0-1)$ and (x0+1, y0+1) associated with $c_8$. Thus, $g_{1,8}=g_1(x0-1, y0-1)+g_1(x0+1, y0+1)$. The description can be applied to i being 7, 1, . . . , or 12. When i is 11, the two sample positions correspond to the coefficient $c_i$ (e.g., $c_{11}$) and are positioned at positions associated with $c_i$, such as (x0-2, y0) and (x0+2, y0) associated with $c_{11}$. Thus, $g_{1,11}=g_1(x0-2, y0)+g_1(x0+2, y0)$, such as described in FIGS. 9-10. When i is 13, the sample position (e.g., the current sample position (x0, y0)) corresponds to the coefficient $c_{13}$. Thus, $g_{1,13}=g_1(x0, y0)$. $g_1(x0, y0)$ can indicate a difference (e.g., a clipped difference) between R(x0, y0) and $R_1(x0, y0)$.

FIG. 12 shows a flow chart outlining a process (1200) according to an embodiment of the disclosure. The process (1200) can be used in a video encoder. In various embodiments, the process (1200) is executed by processing circuitry, such as the processing circuitry that performs functions of the video encoder (103), the processing circuitry that performs functions of the video encoder (303), and the like. In some embodiments, the process (1200) is implemented in software instructions, thus when the processing circuitry executes the software instructions, the processing circuitry performs the process (1200). The process (1200) can implement a filtering process, such as the complete two-step filtering process described above. The process (1200) starts at (S1201) and proceeds to (S1210).

At (S1210), one or more first filters (e.g., $F_0$, $F_1$, or the like) can be applied to samples in a picture to obtain one or more respective first filtered outputs (e.g., $R_0$, $R_1$, or the like) of the samples in the picture. The samples in the picture can include a current sample $R_0$ (x0, y0) to be filtered by a second filter (e.g., the second filter $F_A$). Each of the one or more first filtered outputs can include first filtered samples that are the samples in the picture filtered by a respective first filter in the one or more first filters.

In an example, the samples in the picture include samples associated with the current sample, such as the samples in a surrounding region of the current sample. For example, the samples in the surrounding region are associated with the coefficients $c_0$ to $c_{19}$ in FIG. 9.

At (S1220), the second filter can be applied to the one or more first filtered outputs to obtain a second filtered sample (e.g., R(x0, y0) in Eqs. (16)-(23)) of the current sample. Each coefficient $c_i$ of the second filter can be applied to a corresponding one of the one or more first filtered outputs (e.g., $R_0$, $R_1$, or the like).

Then, the process (1200) proceeds to (S1299) and terminates.

The process (1200) can include a first filtering step, such as performed in (S1210) and a second filtering step, such as performed in (S1220).

The process (1200) can be suitably adapted. Step(s) in the process (1200) can be modified and/or omitted. Additional step(s) can be added. Any suitable order of implementation can be used. In an example, prior to (S1210), the samples in the picture are inter or intra coded.

Figure 13:
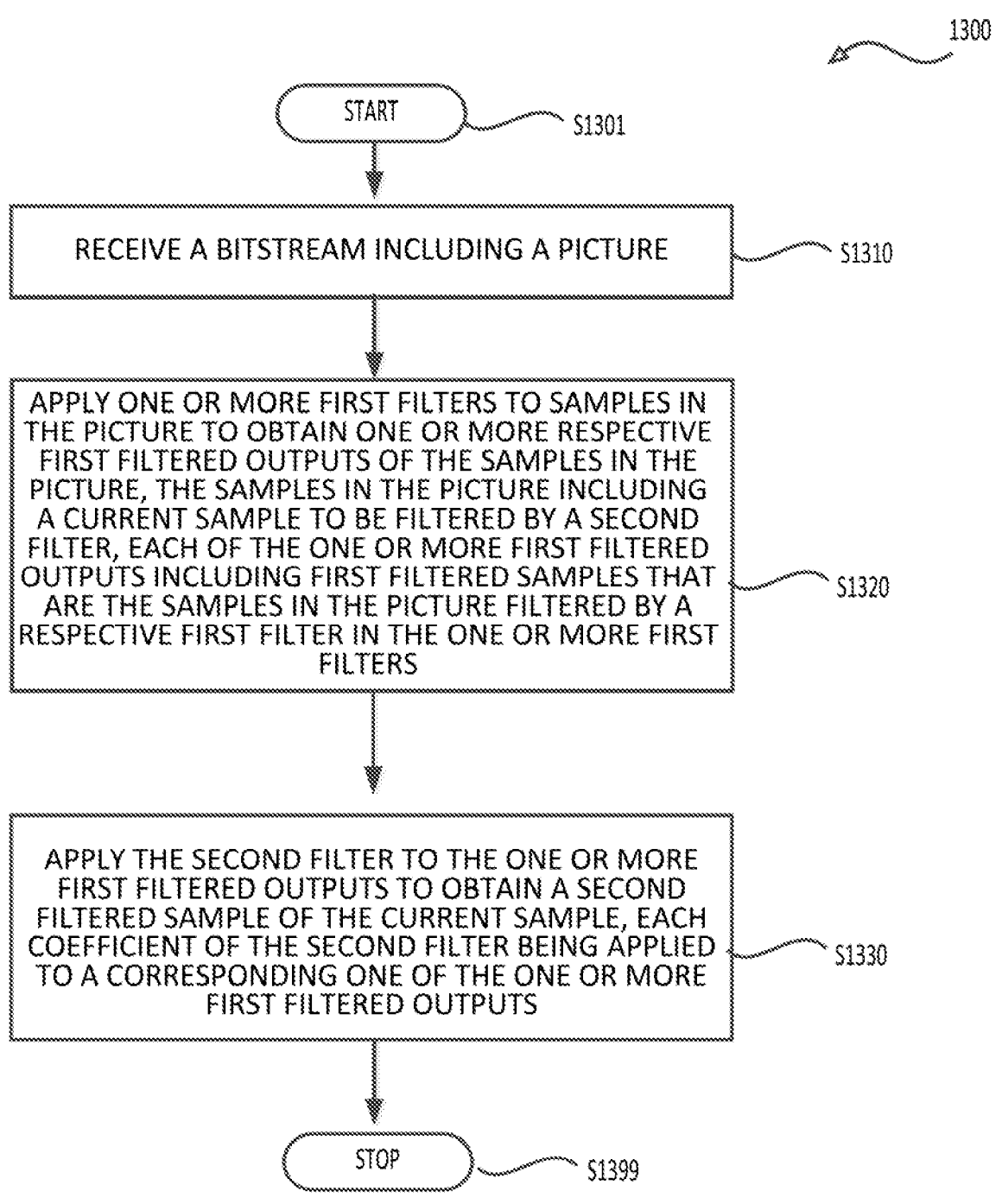
FIG. 13 shows a flow chart outlining a decoding process according to an embodiment of the disclosure.

FIG. 13 shows a flow chart outlining a process (1300) according to an embodiment of the disclosure. The process (1300) can be used in a video/image decoder. In various embodiments, the process (1300) is executed by processing circuitry, such as the processing circuitry that performs functions of the video decoder (110), the processing circuitry that performs functions of the video decoder (210), and the like. In some embodiments, the process (1300) is implemented in software instructions, thus when the processing circuitry executes the software instructions, the processing circuitry performs the process (1300). The process (1300) can implement a filtering process, such as the complete two-step filtering process described above. The process (1300) starts at (S1301) and proceeds to (S1310).

At (S1310), a bitstream including a picture can be received.

At (S1320), one or more first filters, for example, one or more first fixed filters with constant filter coefficients (e.g., $F_0$, $F_1$, or the like) can be applied to samples in the picture to obtain one or more respective first filtered outputs (e.g., $R_0$, $R_1$, or the like) of the samples in the picture. The samples in the picture can include a current sample $R_0$ (x0, y0) to be filtered by a second filter (e.g., the second filter $F_A$). Each of the one or more first filtered outputs can include first filtered samples that are the samples in the picture filtered by a respective first filter in the one or more first filters.

In an example, the samples in the picture include samples associated with the current sample, such as the samples in a surrounding region of the current sample. For example, the samples in the surrounding region are associated with the coefficients $c_0$ to $c_{19}$ in FIG. 9.

In an example, each of the one or more first filters is from a respective pre-defined filter set. In an example, the second filter is selected from an adaptive filter set signaled in the bitstream.

At (S1330), the second filter can be applied to the one or more first filtered outputs to obtain a second filtered sample (e. g., R(x0, y0) in Eqs. (16)-(23)) of the current sample. Each coefficient $c_i$ of the second filter can be applied to a corresponding one of the one or more first filtered outputs (e.g., $R_0$, $R_1$, or the like). In an example, the second filter is an adaptive filter with changeable coefficients. In an example, the second filter can be applied to the one or more first filtered outputs subsequent to the step (S1320).

In an example, the one or more first filters include a first filter (e.g., $F_0$), a first filtered output (e.g., $R_0$) in the one or more first filtered outputs includes the first filtered samples $R_0$ (x, y) from the first filter, and a plurality of coefficients (e.g., the coefficients $c_0$ to $c_{19}$ in FIG. 9, the coefficients $c_0$ to $c_{20}$ in FIG. 10, or the coefficients $c_0$ to $c_6$ in FIG. 11) of the second filter can be applied to the first filtered output.

In an example, such as shown in FIG. 9, each of the plurality of coefficients (e.g., the coefficients $c_0$ to $c_{19}$ in FIG. 9) of the second filter that is applied to the first filtered output is associated with one or more positions in a region of the picture. In an example, the region only includes a surrounding region of the current sample. In an example, the region includes the surrounding region of the current sample and the current sample. For each (e.g., $c_0$, $c_1$, . . . , or $c_{19}$ in FIG. 9) of the plurality of coefficients, one or more differences corresponding to the one or more positions in the region of the picture can be determined. Referring to FIG. 9, a difference (e.g., $g_0$ (x0−1, y0−1)) for each position (e.g., (x0−1, y0−1)) of the one or more positions can be between an unfiltered sample R (x0−1, y0−1) and the first filtered sample (e.g., $R_0$ (x0−1, y0−1)) that are located at the respective position (e.g., (x0−1, y0−1)). The respective coefficient (e.g., $c_{11}$) can be applied to a sum (e.g., $g_{0,11}=g_0$ (x0−1, y0−1)+$g_0$(x0+1, y0+1)) of the one or more differences (e.g., $g_0$(x0−1, y0−1) and $g_0$(x0+1, y0+1)).

In an embodiment, the one or more first filters include at least another first filter (e.g., $F_1$), and the one or more first filtered outputs includes at least another first filtered output (e.g., $R_1$). At least one coefficient (e.g., $c_{20}$ in FIG. 9) of the second filter that is different from the plurality of coefficients (e.g., the coefficients $c_0$ to $c_{19}$ in FIG. 9) can be applied to the at least another first filtered output (e.g., $R_1$). In an example, for each first filtered output (e.g., $R_1$) of the at least another first filtered output (e.g., $R_1$), a difference (e.g., a clipped difference) (e.g., $g_{1,0}=g_1$(x0, y0)) between an unfiltered current sample R(x0, y0) and the first filtered sample $R_1$(x0, y0) of the respective first filtered output at the current sample position can be determined. A respective coefficient (e.g., $c_{20}$ in FIG. 9) of the second filter can be applied to the difference (e.g., $g_{1,0}=g_1$(x0, y0)).

In an embodiment, the one or more first filters include the first filter denoted as $F_0$ and a first filter $F_1$, and the one or more first filtered outputs includes the first filtered output denoted as $R_0$ and another first filtered output $R_1$ that is an output from the first filter $F_1$. A difference between the unfiltered current sample and the first filtered sample of the first filtered output $R_1$ at the current sample position can be determined and a coefficient of the second filter that is different from the plurality of coefficients can be applied to the difference, such as described with reference to Eq. (19) and FIGS. 9-10.

In an example, such as shown in FIG. 9, the region excludes the current sample and has a symmetric diamond shape around the current sample, and each coefficient (e.g., $c_{11}$) of the plurality of coefficients (e.g., the coefficients $c_0$ to $c_{19}$ in FIG. 9) of the second filter is associated with two positions (e.g., (x0−1, y0−1) and (x0+1, y0+1)) in the region that are symmetric with respect to the current sample.

In an example, such as shown in FIG. 10, the region includes the current sample, the plurality of coefficients (e.g., the coefficients $c_0$ to $c_{20}$ in FIG. 10) includes a first coefficient (e.g., $c_{20}$) associated with (or applied to) the current sample and second coefficients (e.g., $c_0$ to $c_{19}$), and each (e.g., $c_{11}$) of the second coefficients is associated with two positions (e.g., (x0−1, y0−1) and (x0+1, y0+1)) in the region that are symmetric with respect to the current sample.

In an embodiment, the one or more first filters include a plurality of first filters (e.g., $F_0$, $F_1$, . . . , and $F_{p-1}$). The one or more first filtered outputs include a plurality of first filtered outputs (e.g., $R_0$, $R_1$, . . . , and $R_{p-1}$) from the plurality of first filters, respectively. The second filter includes a plurality of subsets (e.g., p subsets) of coefficients applied to the plurality of first filtered outputs, respectively. Each subset of coefficients of the second filter can be applied to the respective first filtered output. In an example, referring to Eq. 22, each of the subset of coefficients of the second filter is associated with one or more positions in a respective region of the picture. The respective region can include the surrounding region of the current sample, and the samples in the picture can include samples (e.g., in the surrounding region) associated with the current sample. The respective region can include or exclude the current sample. For each coefficient of the respective subset of coefficients, one or more differences corresponding to the one or more positions in the respective region of the picture can be determined. A difference for each position of the one or more positions can be between an unfiltered sample and the respective first filtered output that are located at the respective position. The respective coefficient can be applied to a sum of the one or more differences.

In an example, the plurality of first filters includes a first filter $F_0$ and a first filter $F_1$, and the plurality of first filtered outputs includes a first filtered output $R_0$ from the first filter $F_0$ and a first filtered output $R_1$ from the first filter $F_1$. In an example, referring to FIG. 11, the regions associated with the first filter $F_0$ and the first filter $F_1$ are identical and diamond shaped (e.g., 5×5 diamond shaped), and the regions include the current sample and the surrounding region of the current sample. Referring to FIG. 11, the regions associated with the first filter $F_0$ and the first filter $F_1$ are identical to the region supported by the second filter $F_A$.

Then, the process proceeds to (S1399) and terminates. The process (1300) can be suitably adapted. Step(s) in the process (1300) can be modified and/or omitted. Additional step(s) can be added. Any suitable order of implementation can be used. In an example, the picture is decoded based at least on the second filtered sample of the current sample.

Various embodiments described in the process (1300) can be applied to the process (1200) used in an encoding process.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
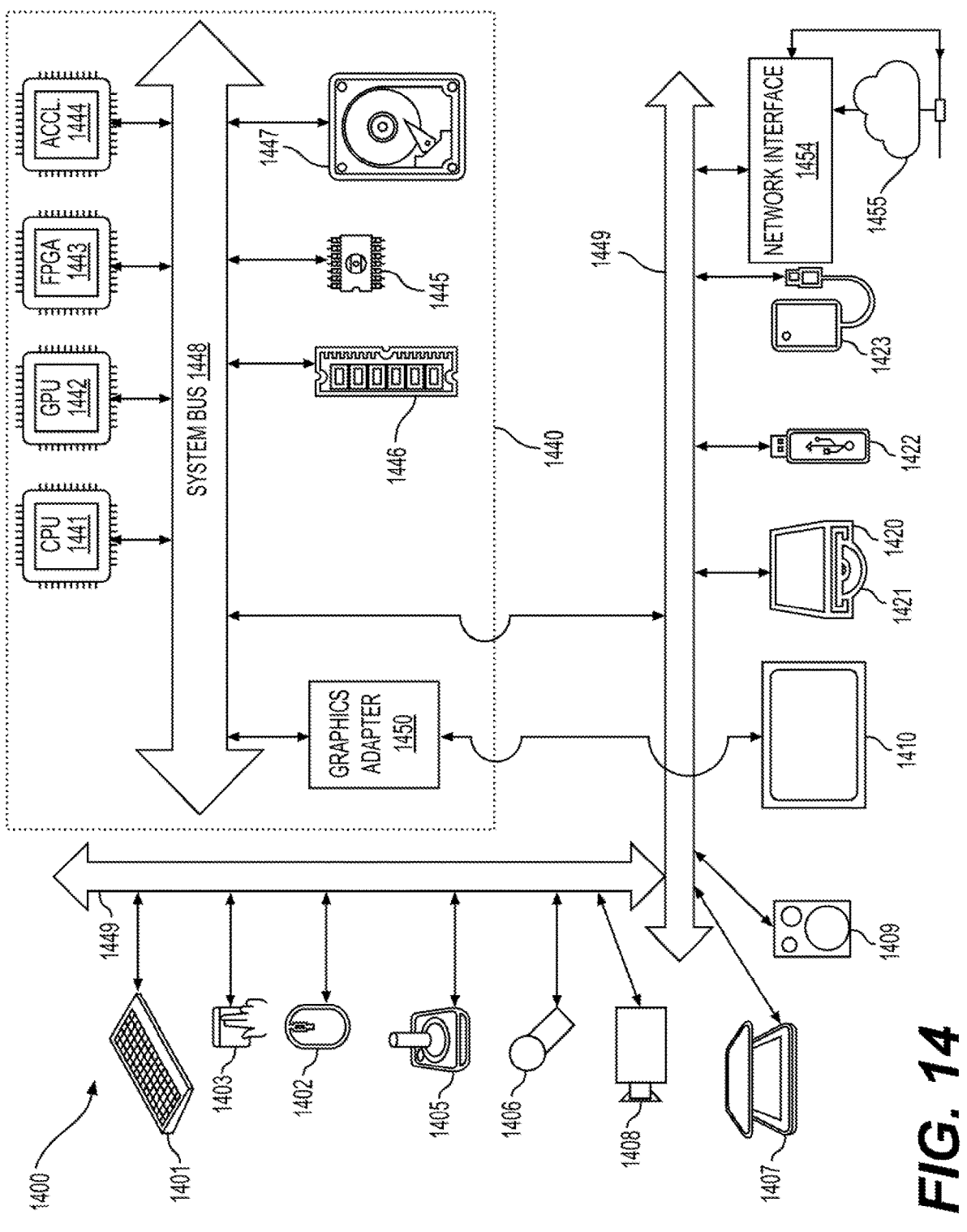
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a video coder, the method comprising:

receiving a bitstream including a picture;

applying one or more first fixed filters with constant filter coefficients to samples in the picture that are associated with a current sample to obtain one or more respective first filtered outputs of the samples in the picture, wherein the one or more first fixed filters are trained adaptive filters and include a first fixed filter denoted as $F_0$, a first filtered output denoted as $R_0$ in the one or more first filtered outputs including first filtered samples that are the samples in the picture filtered by the first fixed filter $F_0$;

subsequent to applying the one or more first fixed filters, applying a second adaptive filter with changeable coefficients to the one or more first filtered outputs to obtain a second filtered sample of the current sample in the samples; and decoding the picture based at least on the second filtered sample of the current sample in the picture, wherein the constant filter coefficients of the one or more first fixed filters are not signaled in the bitstream, the changeable coefficients of the second adaptive filter are signaled in the bitstream, a subset of changeable coefficients in the changeable coefficients of the second adaptive filter is applied to the first filtered output, each of the subset of changeable coefficients is associated with one or more positions in a region of the picture, the region including a surrounding region of the current sample, and the applying the second adaptive filter includes, for each of the subset of changeable coefficients, determining one or more differences corresponding to the one or more positions in the region of the picture, the difference for each position of the one or more positions being between an unfiltered sample and the first filtered sample that are located at the respective position; and applying the respective changeable coefficient to a sum of the one or more differences.

2. The method of claim 1, wherein each of the one or more first filtered outputs includes first filtered samples that are the samples in the picture filtered by a respective first fixed filter in the one or more first fixed filters, and each changeable coefficient in the changeable coefficients of the second adaptive filter is applied to a corresponding one of the one or more first filtered outputs.

3. The method of claim 2, wherein the one or more first fixed filters include at least another first fixed filter, the one or more first filtered outputs include at least another first filtered output, and the applying the second adaptive filter further includes applying at least one changeable coefficient of the second adaptive filter that is different from the subset of changeable coefficients to the at least another first filtered output.

4. The method of claim 3, wherein the applying the at least one coefficient comprises:

for each first filtered output of the at least another first filtered output, determining a difference between an unfiltered current sample and the first filtered sample of the respective first filtered output that is collocated with the current sample; and applying a respective coefficient of the second adaptive filter to the difference.

5. The method of claim 2, wherein the one or more first fixed filters include the first fixed filter $F_0$ and a first fixed filter $F_1$, the one or more first filtered outputs include the first filtered output $R_0$ and another first filtered output $R_1$ that is an output from the first fixed filter $F_1$, and the applying the second adaptive filter further includes:

determining a difference between the unfiltered current sample and the first filtered sample of the first filtered output $R_1$ that is collocated with the current sample; and applying a changeable coefficient in the changeable coefficients of the second adaptive filter that is different from the subset of changeable coefficients to the difference.

6. The method of claim 5, wherein the region excludes the current sample and has a symmetric diamond shape around the current sample; and each of the subset of changeable coefficients of the second adaptive filter is associated with two positions in the region that are symmetric with respect to the current sample.

7. The method of claim 5, wherein the region includes the current sample;

the subset of changeable coefficients includes a first changeable coefficient associated with the current sample and second changeable coefficients; and each of the second changeable coefficients is associated with two positions in the region that are symmetric with respect to the current sample.

8. The method of claim 2, wherein the one or more first fixed filters include a plurality of first fixed filters that includes the first fixed filter $F_0$, the one or more first filtered outputs include a plurality of first filtered outputs from the plurality of first fixed filters, respectively, the plurality of first filtered outputs including the first filtered output $R_0$, the changeable coefficients in the second adaptive filter include a plurality of subsets of changeable coefficients applied to the plurality of first filtered outputs, respectively, the plurality of subsets of changeable coefficients including the subset of changeable coefficients applied to the first filtered output, and the applying the second adaptive filter includes applying each subset of coefficients of the second adaptive filter to the respective first filtered output.

9. The method of claim 8, wherein for each subset of coefficients in the plurality of subsets of changeable coefficients of the second adaptive filter, each coefficient of the respective subset of coefficients of the second adaptive filter is associated with one or more positions in a respective region of the picture, the respective region including a surrounding region of the current sample, the samples in the picture include samples associated with the current sample, and for each coefficient of the respective subset of coefficients, the applying each subset of coefficients includes determining one or more differences corresponding to the one or more positions in the respective region of the picture, a difference for each position of the one or more positions being between an unfiltered sample and the respective first filtered output that are located at the respective position; and applying the respective coefficient to a sum of the one or more differences.

10. The method of claim 9, wherein the plurality of first fixed filters further includes a first fixed filter $F_1$, and the plurality of first filtered outputs further includes a first filtered output $R_1$ from the first fixed filter $F_1$.

11. The method of claim 10, wherein the regions associated with the first fixed filter $F_0$ and the first fixed filter $F_1$ are identical and diamond shaped, and the regions include the current sample.

12. The method of claim 6, wherein the first fixed filter $F_0$ and the first fixed filter $F_1$ have a 13×13 symmetric diamond shape.

13. The method of claim 2, wherein a number of coefficients in the second adaptive filter is 14, 21, or 22.

14. An apparatus for video decoding, comprising processing circuitry configured to:

receive a bitstream including a picture;

apply one or more first fixed filters with constant filter coefficients to samples in the picture that are associated with a current sample to obtain one or more respective first filtered outputs of the samples in the picture, wherein the one or more first fixed filters are trained adaptive filters and include a first fixed filter denoted as $F_0$, a first filtered output denoted as $R_0$ in the one or more first filtered outputs including first filtered samples that are the samples in the picture filtered by the first fixed filter $F_0$;

subsequent to applying the one or more first fixed filters, apply a second adaptive filter with changeable coefficients to the one or more first filtered outputs to obtain a second filtered sample of the current sample in the samples; and decode the picture based at least on the second filtered sample of the current sample in the picture, wherein the constant filter coefficients of the one or more first fixed filters are not signaled in the bitstream, the changeable coefficients of the second adaptive filter are signaled in the bitstream, a subset of changeable coefficients in the changeable coefficients of the second adaptive filter is applied to the first filtered output, each of the subset of changeable coefficients is associated with one or more positions in a region of the picture, the region including a surrounding region of the current sample, and the processing circuitry is configured to, for each of the subset of changeable coefficients, determine one or more differences corresponding to the one or more positions in the region of the picture, the difference for each position of the one or more positions being between an unfiltered sample and the first filtered sample that are located at the respective position; and apply the respective changeable coefficient to a sum of the one or more differences.

15. The apparatus of claim 14, wherein each of the one or more first filtered outputs includes first filtered samples that are the samples in the picture filtered by a respective first fixed filter in the one or more first fixed filters, and each changeable coefficient in the changeable coefficients of the second adaptive filter is applied to a corresponding one of the one or more first filtered outputs.

16. A non-transitory computer-readable medium storing instructions which when executed by a computer for video decoding cause the computer to perform a method, the method comprising:

receiving a bitstream including a picture;

applying one or more first fixed filters with constant filter coefficients to samples in the picture that are associated with a current sample to obtain one or more respective first filtered outputs of the samples in the picture, wherein the one or more first fixed filters are trained adaptive filters and include a first fixed filter denoted as $F_0$, a first filtered output denoted as $R_0$ in the one or more first filtered outputs including first filtered samples that are the samples in the picture filtered by the first fixed filter $F_0$;

subsequent to applying the one or more first fixed filters, applying a second adaptive filter with changeable coefficients to the one or more first filtered outputs to obtain a second filtered sample of the current sample in the samples; and decoding the picture based at least on the second filtered sample of the current sample in the picture, wherein the constant filter coefficients of the one or more first fixed filters are not signaled in the bitstream, the changeable coefficients of the second adaptive filter are signaled in the bitstream, a subset of changeable coefficients in the changeable coefficients of the second adaptive filter is applied to the first filtered output, each of the subset of changeable coefficients is associated with one or more positions in a region of the picture, the region including a surrounding region of the current sample, and the applying the second adaptive filter includes, for each of the subset of changeable coefficients, determining one or more differences corresponding to the one or more positions in the region of the picture, the difference for each position of the one or more positions being between an unfiltered sample and the first filtered sample that are located at the respective position; and applying the respective changeable coefficient to a sum of the one or more differences.

* * * * *